(12) United States Patent
Boguess

(10) Patent No.: US 12,063,008 B2
(45) Date of Patent: *Aug. 13, 2024

(54) TRANSPORTABLE AND MULTI CONFIGURABLE, MODULAR POWER PLATFORMS

(71) Applicant: Brian C. Boguess, Santa Monica, CA (US)

(72) Inventor: Brian C. Boguess, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,491

(22) Filed: Mar. 4, 2022

(65) Prior Publication Data

US 2022/0329202 A1 Oct. 13, 2022

Related U.S. Application Data

(63) Continuation of application No. 16/847,480, filed on Apr. 13, 2020, now Pat. No. 11,271,520, which is a
(Continued)

(51) Int. Cl.
*E04D 13/18* (2018.01)
*F24S 25/12* (2018.01)
*F24S 25/617* (2018.01)
*F24S 25/65* (2018.01)
*F24S 25/70* (2018.01)
(Continued)

(52) U.S. Cl.
CPC .............. *H02S 30/10* (2014.12); *F24S 25/12* (2018.05); *F24S 25/617* (2018.05); *F24S 25/65* (2018.05); *F24S 25/70* (2018.05); *H02S 20/10* (2014.12); *H02S 20/30* (2014.12); *H02S 40/32* (2014.12);
(Continued)

(58) Field of Classification Search
CPC .......... F24S 25/617; F24S 25/65; H02S 30/10
See application file for complete search history.

(56) References Cited

U.S. PATENT DOCUMENTS 4,269,173 A * 5/1981 Krueger ................. F24S 25/10
126/634
4,512,334 A * 4/1985 Peachey ................. F24S 60/00
126/618
(Continued)

*Primary Examiner* — Basil S Katcheves
(74) *Attorney, Agent, or Firm* — William A. English; Vista IP Law Group LLP

(57) ABSTRACT

Support platforms for one or more solar panels and systems and methods for securing support platforms are provided. In one embodiment, a frame of a support platform includes a plurality of support legs, each leg including a shoe plate. One or more toggle anchors with rod and/or cable are provided that include an anchor portion and a toggle portion pivotally coupled to the anchor portion, and a rod and/or cable is coupled to the toggle portion. Each anchor is driven into the ground with a driving rod such that an exposed end of the rod and/or cable extends from the ground. The driving rod is removed, and the rod and/or cable is pulled to deploy the anchor, and which the anchor is pull tested and measured in real time soil conditions whereupon the exposed end is coupled to the shoe plate of one of the support legs to apply a desired tensile force between the exposed end and the anchor to secure the support leg and, consequently, the support platform relative to the ground.

22 Claims, 21 Drawing Sheets

Related U.S. Application Data continuation of application No. 16/030,774, filed on Jul. 9, 2018, now Pat. No. 10,622,938.

(60) Provisional application No. 62/530,782, filed on Jul. 10, 2017.

(51) Int. Cl.
*H02S 20/10* (2014.01)
*H02S 20/30* (2014.01)
*H02S 30/10* (2014.01)
*H02S 40/32* (2014.01)
*H02S 40/38* (2014.01)
*F24S 25/00* (2018.01)

(52) U.S. Cl.
CPC ......... *H02S 40/38* (2014.12); *F24S 2025/014* (2018.05); *F24S 2025/019* (2018.05)

(56) References Cited

U.S. PATENT DOCUMENTS

| | | | | |
|---|---|---|---|---|
| 5,125,608 A * | 6/1992 | McMaster | | F24S 25/12 |
| | | | | 248/676 |
| 6,201,181 B1 * | 3/2001 | Azzam | | H02S 10/40 |
| | | | | 136/246 |
| 6,629,389 B1 * | 10/2003 | Rust | | G09F 15/00 |
| | | | | 52/157 |
| 7,481,211 B2 * | 1/2009 | Klein | | F24S 25/617 |
| | | | | 126/621 |
| 8,119,963 B2 * | 2/2012 | Scanlon | | F24S 30/455 |
| | | | | 250/203.4 |
| 8,492,645 B1 * | 7/2013 | Strahm | | H02S 30/20 |
| | | | | 136/246 |
| 8,684,190 B2 * | 4/2014 | Abar | | H02S 20/10 |
| | | | | 248/150 |
| 9,038,331 B2 * | 5/2015 | Kawakatsu | | H02S 40/36 |
| | | | | 52/173.3 |
| D739,819 S * | 9/2015 | Hannum | | D13/110 |
| 9,287,822 B2 * | 3/2016 | Levi | | F24S 25/70 |
| 9,444,395 B2 * | 9/2016 | Tung | | F24S 25/65 |
| 11,271,520 B2 * | 3/2022 | Boguess | | F24S 25/65 |
| 2002/0179138 A1 * | 12/2002 | Lawheed | | F24S 50/20 |
| | | | | 136/246 |
| 2007/0000183 A1 * | 1/2007 | Logan | | E04H 15/644 |
| | | | | 52/169.1 |
| 2009/0032089 A1 * | 2/2009 | Chen | | H02S 20/24 |
| | | | | 136/246 |
| 2009/0145423 A1 * | 6/2009 | Carcangiu | | H02S 20/00 |
| | | | | 126/600 |
| 2009/0165841 A1 * | 7/2009 | Gunn, Jr. | | H02S 20/00 |
| | | | | 136/245 |
| 2010/0175741 A1 * | 7/2010 | Thorne | | H02S 20/32 |
| | | | | 136/251 |
| 2010/0269888 A1 * | 10/2010 | Johnston, Jr. | | H02S 20/23 |
| | | | | 136/251 |
| 2011/0024582 A1 * | 2/2011 | Gies | | F24S 25/10 |
| | | | | 248/122.1 |
| 2011/0132353 A1 * | 6/2011 | Gumm | | H02S 20/30 |
| | | | | 29/890.033 |
| 2011/0155218 A1 * | 6/2011 | Buchel | | F24S 30/455 |
| | | | | 136/246 |
| 2011/0176256 A1 * | 7/2011 | Van Straten | | F03D 13/20 |
| | | | | 290/55 |
| 2013/0118099 A1 * | 5/2013 | Scanlon | | H02J 7/00 |
| | | | | 136/246 |
| 2014/0196761 A1 * | 7/2014 | Tilley | | F24S 50/20 |
| | | | | 136/246 |
| 2016/0024739 A1 * | 1/2016 | Kelleher | | F24S 25/617 |
| | | | | 405/253 |

* cited by examiner

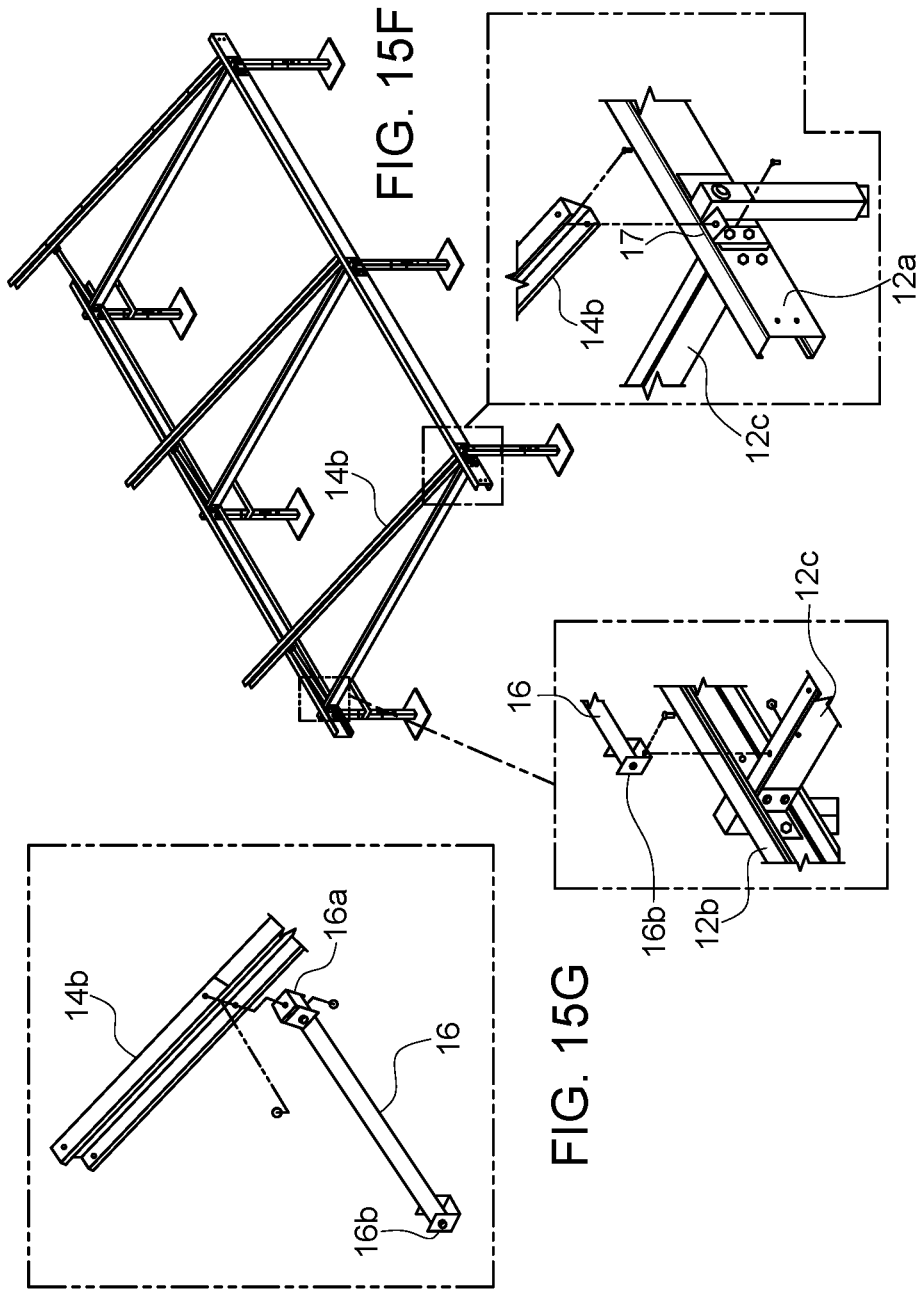

TRANSPORTABLE AND MULTI CONFIGURABLE, MODULAR POWER PLATFORMS

RELATED APPLICATION DATA

The present application is a continuation of co-pending application Ser. No. 16/847,480, filed Apr. 13, 2020, issuing as U.S. Pat. No. 11,271,520, which is a continuation of application Ser. No. 16/030,774, filed Jul. 9, 2018, now U.S. Pat. No. 10,622,938, issued Apr. 14, 2020, which claims benefit of provisional application Ser. No. 62/530,782, filed Jul. 10, 2017, the entire disclosures of which are expressly incorporated by reference herein.

TECHNICAL FIELD

This present application relates to renewable energy systems using a surface mounted application, and more particularly, to transportable, customizable, multi-configurable, and/or surface mounted modular solar power platforms for on and off grid solar installation. The transportable, modular solar power platforms herein may be customizable, turnkey, portable, transportable, multi-configurable, and/or modular surface mounted solar power platforms (modular units) that may be installed temporarily or permanently on different types of earth surface conditions, ground, soil, and paved conditions, and other terrestrial terrain to achieve a desired power wattage depending on a desired power (kWh) output.

BACKGROUND

It is well known that alternative renewable energy resources are proven to be an important element in an overall energy plan for the off taker. Cost savings initiatives and a renewable and sustainable clean energy solution to lower the cost of energy (LCOE), is a critical factor as the cost of carbon based fuels and other fossil fuels are costly to use and continue to increase cost over time and these fossil fuels harm the environment and impact climate change. Grid parity has been achieved in large utility scale solar power plant installation, but not in distributed generation renewable energy applications. Solar (PV) energy, and energy storage systems (ESS) help recipients of this clean, renewable energy to load shift away from high rate tariffs and demand charges or be totally independent of the electrical grid. In order to produce sufficient usable and reusable clean energy from the sun, it is necessary to place one or more solar arrays in areas where they can capture the most solar radiation.

Conventional foundations and support structures required to install such solar arrays generally involve pre-development and engineering, geotechnical reports, environmental impact studies, site planning, grading, mobilization of heavy equipment, concrete, substantial procurement time and cost, installation time and cost, particularly for I beam steel piles, ballasted concrete blocks, pour in place cement piers or helical ground screw foundations used for surface mounted solar arrays, and involve substantial earth and project site disruption which impact the local environmental. Therefore, improved solar power platforms, support structures and foundations for solar arrays and methods for installing and/or using them would be useful, more economical and efficient and most beneficial to the environment.

SUMMARY

The present application is directed to alternative renewable energy systems using surface mounted applications, and more particularly, to transportable, customizable, multi-configurable, and/or surface mounted modular solar power platforms for grid connected and off grid solar installations. The transportable, modular solar power platforms herein may be customizable, turnkey, portable, transportable, multi-configurable, and/or modular surface mounted solar power platforms (modular units) that may be installed temporarily or permanently on different types of earth surface conditions, ground, soil, and paved conditions, and other terrestrial terrain to achieve a desired power wattage depending on a desired power (kWh) output.

A transportable, multi-configurable, modular solar power platform (modular units), according to the platform's systems and methods herein, may solve one or more problems associated with conventional or traditional surface mounted solar arrays, such as:
- Create methods and renewable energy system solutions in the solar industry downstream value chain for distributed generation and utility scale solar power markets to achieve a LCOE;
- Develop economical and efficient surface mounted racking systems, simplify engineering, stream line pre-development, planning, permitting and inspection processes, while using lower cost of labor and modular installation methodologies and solutions that save time and money for surface mounted solar arrays, which may be useful to drive down a LCOE;
- Provide expedited assembly and rapid deployment capability of surface mounted solar arrays for system installers and project developers using a less skilled and local workforce to benefit the local economy, which may be useful to achieve a LCOE;
- Create a greater power (watts) density per surface footprint of a surface mounted solar array using fixed tilt, adjustable tilt, single axis or multiple axis tracker systems to achieve a LCOE;
- Create minimal site disruption, minimal local environmental impact, and/or create sustainable and efficient construction methods and systematic processes for surface mounted solar arrays to achieve LCOE;
- Increase energy power production (kWh) by 20% or more compared to conventional fixed tilt surface mounted solar arrays, when configured as a transportable, modular solar power platform hosting single axis tracker components with solar modules or multiple axis solar tracker components with solar modules.

Transportable, modular solar power platforms (modular units) in accordance with the systems and methods herein do not require the use of concrete piers, ballasted concrete blocks, typical pile driven steel foundations or even ground screws that other surface mount racking systems generally require. There is no welding or cutting steel needed on an installation site. The use of heavy industrial onsite equipment, machinery, and large trucks is not required. Only the use of simple, low cost, portable hand-held power tools and a small portable power generator are needed.

A transportable, modular solar power platform (modular units), according to the systems and methods herein, may reduce the need for pre-development, geotechnical reports or environmental impact studies, unnecessary procurement time and cost, and installation time and cost, particularly compared to conventional surface mounted solar arrays, and may decrease earth and project site disruption and soil erosion. A transportable, modular solar power platform (modular units) may reduce project site logistical costs and transportation of concrete and the use of fossil fuels for heavy industrial onsite equipment and machinery and it helps to lower the overall cost of clean, renewable energy.

Conventional surface mounted solar arrays require a geo-technical report during the pre-development phase or even costly environmental impact studies, which may stall installation and increase costs and/or require site specific engineering and design all prior to a conventional surface mount racking system is ready for permitting. Typical ballasted surface mounted solar racking systems and pour in place cement piers rely on added concrete weight to secure the support structure and resist wind uplift, which requires heavy off-site trucks to deploy the cement, or uses pre-cast ballasted concrete blocks driven to project site. This installation process using cement also requires an additional special inspection.

A conventional or traditional pile driven foundation surface mount system or a system using helical ground screws requires the use of costly on-site industrial machines to deploy the steel foundations or screws with technical skilled certified labor driving these foundations up to fourteen feet (4.3 m) or greater into the ground to support the solar array above the surface of the ground.

In accordance with the systems and methods herein, a transportable, modular solar power platform (modular units) may use one or more small, inexpensive and easy to install toggle anchors attached to a rod and/or cable (as an earth anchoring foundation) to secure the transportable modular solar power platform beneath the surface in which it rests. No heavy pile driving equipment is used—only hand held tools for installation. Instead, toggle anchors with rod and/or cable attach to base plates (shoe plates) when installed to proper depth through access holes in the baseplate of the power platforms and become the foundational support mechanism to secure transportable, modular solar power platforms (modular units) to any earth surface, ground, soil condition or terrestrial terrain.

A transportable, modular solar power platform (modular unit) according to the systems and methods herein uses this toggle anchor with rod and/or cable application as an earth-anchoring foundation, which enables less skilled local labor (at a lower cost of labor) to install a completely turnkey modular power platform unit using only handheld power tools and a portable percussion hammer and small power generator. The use of an inexpensive and easy to install toggle anchor with rod and/or cable as an anchoring foundation, eliminates the need for pre-development geo-technical reports, environmental impact studies, and multiple traditional permit inspection requirements on site during construction by facilitating a real-time soil condition field vertical and lateral load lift (tension) test, e.g., including wind and seismic load requirements, conducted during the real time installation of the power platforms (modular units) to pass geotechnical and structural engineering specifications and local permitting and to measure the load tension results of the toggle anchor with rod and/or cable to assure compliance requirements are achieved with applicable local building codes and regulations.

Using the toggle anchor with rod and/or cable application as the foundation, an installer may perform a credible and permittable vertical and lateral load lift (tension) test in real time soil conditions measuring the tension capacity of the toggle anchor with rod and/or cable, e.g., to exceed 1.5 times the worst case design load capacity and/or as otherwise required by the authority holding jurisdiction (AHJ) for the project site, while the modular solar power platform unit is being installed. This load lift (tension) test may be conducted by the installer in real time using a Load Tension Device (LTD) including a come along hoist, a manual or automated winch or crank to add tension to the toggle anchor with rod and or cable during testing, and a device, e.g., a LED gauge, to measure the results in the field by the installer. The LED gauge may also upload the load test data results in real time to the cloud, e.g., via a WAN/LAN application or (SaaS), and/or otherwise communicated via a wireless and/or other communications network. The LTD may include a GPS device, which may be used to verify each load lift (tension) test performed on the toggle anchor with rod and/or cable tested.

Optionally, the LTD may include a controller with associated software and/or hardware that may provide one or more of the following features. For example, pre-determined optimal tension or load parameters may be programmed into the device, e.g., such that the cable and/or rod of the toggle anchor is pulled to the predetermined tension via the device to pass required load requirement. Once the desired load is achieved, the device may record the achieved load, relieve the tension and/or associated load achieved with operator identification. Optionally, additional information may recorded with the achieved load and/or other test data, e.g., a time stamp identifying the time and/or date of the test, GPS coordinates of the anchor associated with each test, operator identification, and the like, all of which may be downloaded to a portable electronic device at the installation site and/or uploaded to a remote data repository for access and review, e.g., at an office electronic device at the installation site or to one or more off-site electronic devices.

In one embodiment, a graphical user interface may be provided on the electronic device where the data is stored and/or received that may facilitate confirming that all of the installed toggle anchors with rods and/or cables have been properly tested. For example. the electronic device may include a display on which a visual array may be displayed that includes anchor points visually represented in software allowing a reviewer to see all of the stored data associated to the anchors. Cells of the array may also be conditionally formatted so that any discrepancy between load achieved and desired engineering loads are readily identified and may be corrected in the field. For example, all anchors that have been load tested and passed may be presented in a first color, e.g., green, while, anchors that have not yet been tested and/or that have failed may be presented in a different color, e.g., gray for untested anchors, red for anchors that failed the load test, and the like. Thus, a quick visual inspection of the array on the display may allow a reviewer to determine the status of the installation and/or immediately identify any problems. Additional data and information such as labor productivity may also be developed. This load lift (tension) test data may then be easily accessible and verifiable by the structural engineer of record (EOR) without the need for an onsite field review and to review and verify the load test results. After verification, the EOR can download the load test data to the AHJ.

The Load Test Device may be integrated or otherwise mounted to one or more support or extension legs of the modular unit, e.g., such that, when activated, the Load Test Device may automatically apply a preset tension to the toggle anchor with rod and/or cable. The resulting real-time soil condition load test data may then be communicated to give the EOR, permit jurisdictions, AHJs, municipals, customers, energy off takers, investors, and/or the installer complete confidence under applicable code requirements that the transportable, multi-configurable, modular solar power platform (modular unit) is secured to the ground with a stabilized foundation beneath the surface, e.g., to ensure that the resulting foundation exceeds the AHJs worst case load requirements by 1.5 times the design load required.

This real-time soil condition load testing removes other variables and uncertainties that other conventional surface mounted racking systems leave unanswered because the load test results are actually conducted in real time and not calculated results from a geotechnical report conducted months in advance. Testing in real time soil conditions is the preferred method of load testing verse calculated data for AHJs. Load testing in real time soil conditions also improves reliability of site conditions, avoids unforeseen obstacles underneath surface, speeds time to permitting, time to install, final inspection, verification of load test results and project cost savings.

Gaining power density on installation sites with challenging uneven terrain, unforeseen obstacles underneath surface, awkward boundaries or minimal space available for the conventional surface mount solar array are real problems for an installer and can cause financial trouble or costly project delays, which could be avoided using a modular solar power platform (modular units) with toggle anchor with rod and/or cable as the foundation. Transportable, multi-configurable, modular solar power platforms can host fix tilt and adjustable tilt configurations, including single axis tracker components with solar modules or multiple axis tracker components working concurrently and holding a plurality of solar modules. Axis sun trackers are proven to improve power production by as much as 20% over conventional fixed tilt surface mounted solar arrays.

A transportable, multi-configurable modular solar power platform may easily be deployed or unassembled, then re-deployed elsewhere without using heavy equipment or on site industrial machines. For example, a mining operation, needing to lift and shift a capital asset to a new location, can now remove the renewable energy capital asset to another location. The transportable modular solar power platform with toggle anchor rod and/or cable may provide a turnkey lift and shift application not achievable using conventional surface mounted solar arrays with steel I beam or screw foundations because these conventional surface mounted solar arrays leave behind vast amounts of material in the ground and or will require much logistical effort at a cost to remove completely.

The costs and time for removing a conventional solar array is typically about the same as the cost of installing it, while leaving behind material foreign to the project site that may erode or corrode the site over time, causing a negative environmental impact that may last for years. The impact of any material left behind in subterranean conditions may be tremendously harmful to the local environment. This requires installers to spend time and effort and increases the cost of the solar array installation and removal after the life of the conventional solar array system.

A transportable, modular solar power platform may include multiple independently power adjustable, telescoping extension legs and shoe plates (e.g., twelve to eighteen inches (30-45 cm) in diameter) that are used to support the weight of the modular units while generating energy. These extension legs may be raised or lowered using a handheld impact tool or a motor that turns a mechanical crank or other actuator mechanism inside the extension leg frame. This helps the ease and speed of assembling the modular unit. Independently power adjusted extension legs may reduce site preparation and grading requirements and, when combined with a Load Test Device, may assist in the installation and load test of the toggle anchor, with rod and/or cable.

The size of base plates (shoe plates) may vary depending on the weight of modular units and/or the soil conditions below the shoe plate. These shoe plates may distribute the modular unit's weight equally (e.g., about two hundred pounds (91 kg) per leg) to avoid any disruption to the soil conditions beneath the modular unit.

At any time, the toggle anchor with rod and/or cable components may be clipped and the entire modular unit may be reloaded onto a transport flatbed truck or trailer and relocated to a new installation site. Only the toggle anchor with rod and/or cable would remain subterranean. Optionally, the toggle anchor with rod and/or cable may also be pulled out of the ground entirely by surpassing its vertical and lateral load capacity thus removing all the anchor foundation components and leaving nothing behind on the installation site. Consequently, the environmental impact of a modular solar power platform when compared to present conventional solar array systems and methods may be minimal and/or inconsequential.

Hosting or supporting the weight of renewable energy components such as a string inverter or energy storage batteries are not achievable using conventional surface mounted solar arrays with pile driven foundations because there is no support structure frame for the components to be mounted to. Instead, installers need to pour an independent concrete pad (separate from the conventional surface mounted solar array) to support these components. However, the transportable, multi-configurable and modular solar power platforms of the systems herein may include a steel frame uniquely and structurally engineered to support, mount, or ballast the weight of solar inverters, energy storage systems, and/or components and other material/components as needed.

In accordance with one embodiment, a system is provided that includes one or more transportable, customizable and/or multi-configurable modular solar power platforms, each having a support frame, multiple independently, power adjustable telescoping extension support legs and shoe plates, multiple toggle anchor with rod and/or cable foundation components and a support frame to hold a plurality of solar modules, solar inverters, and energy storage systems and components either in fixed tilt or an adjustable position or using single axis tracker components with solar modules and or multi axis solar tracker technology, with solar modules either hingedly connected or clamped to the support frame. A plurality of solar modules may be mounted on the support frame to produce a single modular solar power platform (modular unit), wherein a selected tilt angle is either pre-chosen or adjusted on site to increase the efficiency of the solar modules. Extension support legs, arms and back stays are used to keep each solar module frame at the selected angle or used to support the frame hosting the single or multi axis tracking system components, string solar inverters and energy storage components.

Optionally, the telescoping extension support legs may be independently power adjustable, e.g., using a mechanical actuator encased in or otherwise carried by the support legs, e.g., to raise and lower each modular unit for variable surface conditions or to raise or lower the tilt angle of the solar modules to maximize the sun's radiation. Toggle anchor with rod and/or cable components are used as the modular unit's anchoring foundation. One or more transportable modular solar power platforms may be vertically stacked (placed plum together) such that a plurality of modular units may then be transported to a selected installation site or one or more transportable modular solar power platform units may be placed over a trailer or flatbed truck with or without solar modules attached to support frame and transported from one location to another.

Once at the site, the modular solar power platform units are lifted from a transport vehicle and placed at their desired location or the modular unit extension support legs are lowered to surface and the independently power adjusted legs are raised to position. The truck or trailer may then be easily removed from under the modular unit. The extension support legs may then be adjusted individually for each modular solar power platform unit, e.g., if the surface is not level. Multiple toggle anchors with rods and/or cables are installed and load lift (tension) testing is performed concurrent in real time soil conditions with the modular units being installed. Multiple toggle anchors with rods and/or cables are measured using a simple portable Load Test Device, which may be mounted successively to each extension support leg (or alternatively incorporated into each extension support leg as one component), to verify building code and local AHJ vertical and lateral load requirements and the engineer of record (EOR) structural calculation requirements in a real-time soil condition test. Rapid deployment and load testing may thus be achieved using the systems and methods herein. The modular solar power platforms may then be interconnected to the grid to achieve the power output (kWh) required for any given installation site.

Alternatively, the transportable, modular solar power platform units may be shipped to an installation site with prefabricated components ready for assembly and final set up. Installation is achieved by connecting all the modular unit support frame components together using only handheld power impact tools using simple fasteners, e.g., rivets, nuts, or bolts, and the like, to secure components together or using a portable handheld clinching tool that is used to clinch the steel components together and remove the need for any fasteners. For example, clinching may add rigidity, durability and bonded strength to a transportable, multi-configurable, modular solar power platform.

The transportable, multi-configurable modular solar power platform installation including a plurality of solar panels and load testing process may be achieved in less than one hour per modular unit using a three or four-person installation crew. Thus, relatively rapid deployment may be achieved with tremendous cost savings and limited to no impact on the local environment using the systems and methods herein.

In accordance with another embodiment, a system is provided for mounting a modular support platform for one or more solar panels relative to ground at an installation site that includes an extension support leg comprising one end mounted to a frame of the modular support platform and a second end; a shoe plate attached to the second end of the extension support leg comprising an opening therethrough; and an anchor comprising: a) an anchor portion comprising a penetrating end and a socket end opposite the penetrating end; b) a toggle portion pivotally coupled to the anchor portion between the penetrating end and the socket end, the anchor portion movable between a delivery orientation wherein the socket portion is disposed adjacent the anchor portion and a deployed orientation wherein the toggle portion is oriented transversely relative to the anchor portion; and c) an elongate member, e.g., a rod and/or cable, coupled to the toggle portion having a length sufficient such that an exposed end of the elongate member extends from the ground when the anchor is directed into the ground to direct the anchor portion from the delivery orientation to the deployed orientation, the exposed end receivable through the opening in the shoe plate. The system may also include a rigid driving member including a first end receivable in the socket end and a second driving end for directing the anchor into the ground in the delivery orientation; and a locking mechanism for securing the exposed end of the elongate member relative to the shoe plate and apply a desired tensile force between the exposed end and the anchor portion directed into the ground.

In accordance with another embodiment, a method is provided for securing a modular solar panel platform including a support frame and a plurality of extension legs including shoe plates at an installation site that includes providing an anchor comprising an anchor portion and a toggle portion pivotally coupled to the anchor portion, and an elongate member, e.g., a rod and/or cable, coupled to the toggle portion; directing the anchor into the ground at the installation site such that an exposed end of the elongate member extends from the ground; pulling the exposed end to deploy the anchor portion; coupling the exposed end to a shoe plate of a support leg to secure the support frame relative to the ground at the installation site; and applying a desired tensile force between the exposed end and the anchor to test the installation under real time soil conditions.

Other aspects and features of the present inventions will become apparent from the following description of the invention taken in conjunction with the accompanying drawings.

DETAILED DESCRIPTION OF THE EXEMPLARY EMBODIMENTS

Figure 10:
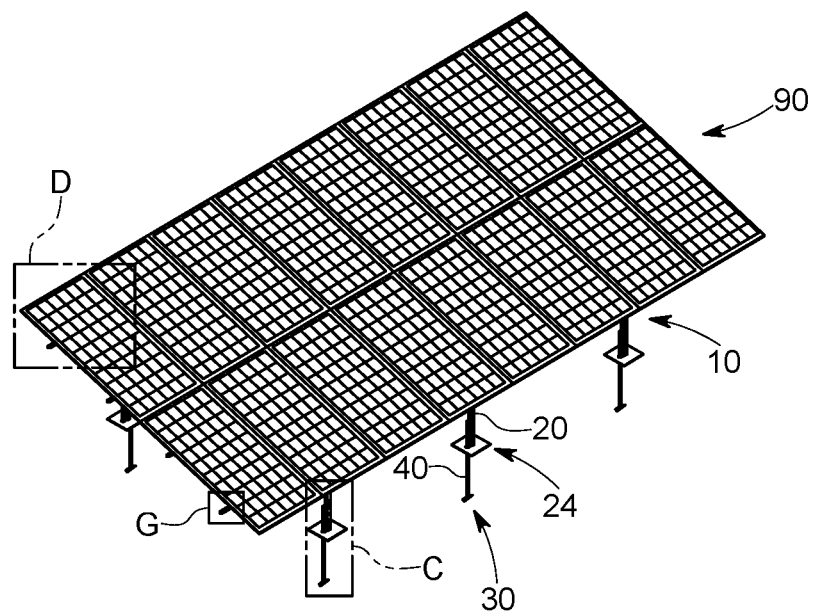
FIG. 10 is a perspective view of an exemplary embodiment of a transportable, multi-configurable, modular solar platform with solar panels mounted on the platform, and toggle anchors with rods and/or cables attached to shoe plates of the modular units to secure the modular units to the ground at a site.

Turning to the drawings, FIGS. 1-4 show an exemplary embodiment of a modular, multi-configurable solar power platform unit 10 that includes a frame 12 supported by a plurality of legs 20 and a rack 14 for mounting one or more solar panels 50 (not shown, see, e.g., FIG. 10). As described elsewhere herein, one or more toggle anchors with rod and/or cable (not shown) may be attached to the frame 12 and/or legs 20 to secure the modular unit 10, and consequently the solar panels 50 mounted to the support frame 14, relative to the ground at an installation site, e.g., to provide an earth-anchoring foundation that may be used to substantially permanently or removably install the solar panels at a desired location.

Generally, the frame 12 includes front and rear chasses or struts 12a, 12b coupled together by mid chasses or struts 12c to provide a substantially rigid structure generally defining a plane. Similarly, the rack 14 includes a plurality of elongate rails 14a coupled by a plurality of elongate supports 14b to which the one or more solar panels may be mounted. The rack 14 may be fixedly mounted to the support frame 14, e.g., at a predefined inclined angle, or may be adjustable, e.g., manually or using a motorized actuator, to change the inclined angle of the rack 14, as described elsewhere herein.

For example, as shown, lower ends 14b-1 of the supports 14b may be mounted directly to the front strut 12a of the frame 12, e.g., at fixed or pivotable connection points, while upper ends 14b-2 of the supports 14b may be coupled to one or more back braces 16 that secure the upper ends 14b-2 spaced above the rear strut 12b. In one embodiment, the braces 16 may be substantially permanently fixed relative to the frame 12 and rack 14. Alternatively, the braces 16 may be adjustable, e.g., to vary a length of the braces 16 and consequently the tilt angle of the rack 14 relative to the frame 12. For example, each brace 16 may include telescoping tubes, G-rails, or other elongate members that may be slidable or otherwise movable relative to one another to adjust their length. Such members may be adjustable manually and then secured at a desired length or may be coupled to a motor or other actuator (not shown), e.g., such that the length may be adjusted remotely and/or automatically, e.g., as part of a tracking system, as described elsewhere herein.

Alternatively, the braces 16 may be removable and a kit including a plurality of braces having different lengths may be provided, e.g., such that one set of braces 16 may be selected and mounted between the rack 14 and frame 12 to set the tilt angle as desired for a particular installation. If the rack 14 is adjustable, the lower ends 14b-2 of the supports 14b may be pivotally coupled to the frame 12, e.g., using one or more hinges and the like (not shown).

It will be appreciated that the components of the platform 10 may be formed using conventional materials and methods, e.g., formed from metal such as steel or aluminum, plastics, or composites, having desired cross-sections or configurations. For example, the struts 12a, 12b, rails 14a, and supports 14b may be elongate "C" channel members, tubular beams, I-beams, and the like, formed by roll forming, breaking, extrusion, casting, and the like. The components may be attached together using one or more conventional methods, for example, using one or more fasteners, e.g., screws, rivets, bolts, and the like, and/or directly by clinching, welding, bonding with adhesive, and the like.

The legs 20 may be attached to the front and rear struts 12a, 12b such that the legs 20 extend downwardly or otherwise orthogonal to the plane of the frame 12. In an exemplary embodiment shown in FIG. 5, each leg 20 generally includes an upper end 20a including a mounting bracket 22 for securing the upper end 20a to the frame 12, and a lower end 20b including a plate or shoe 24, e.g., attached to the leg 20 to define a relatively large area lower contact surface that extends substantially transversely, e.g., horizontally, for placement against a mounting surface, e.g., the ground at an installation site. For example, the area of the contact surface of the shoe 24 may be set based on the weight of modular units, soil conditions below the shoe plate, and/or other parameters, e.g., to ensure that the shoe plates sufficiently distribute the modular unit's weight equally to avoid any disruption to the soil conditions beneath the modular unit.

Figure 1:
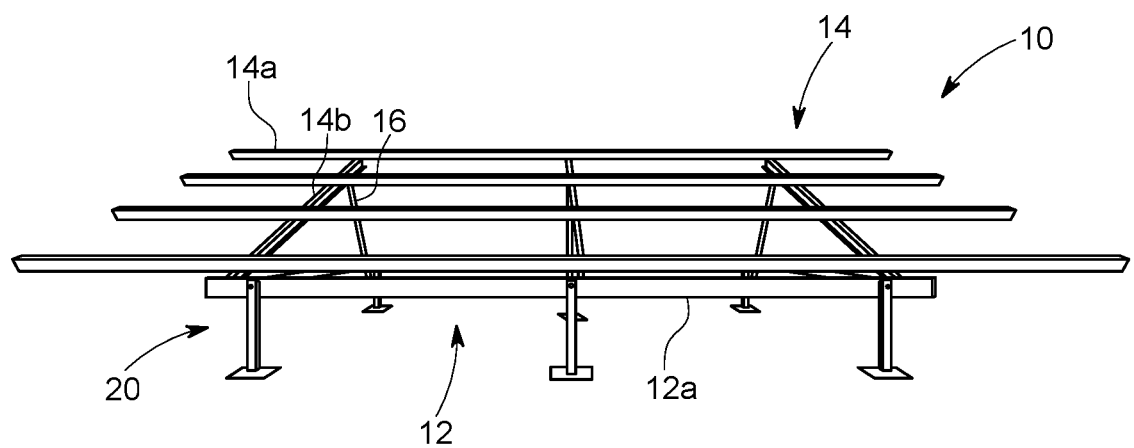
FIG. 1 is a front view of an exemplary embodiment of a transportable modular solar platform.
Figure 2:
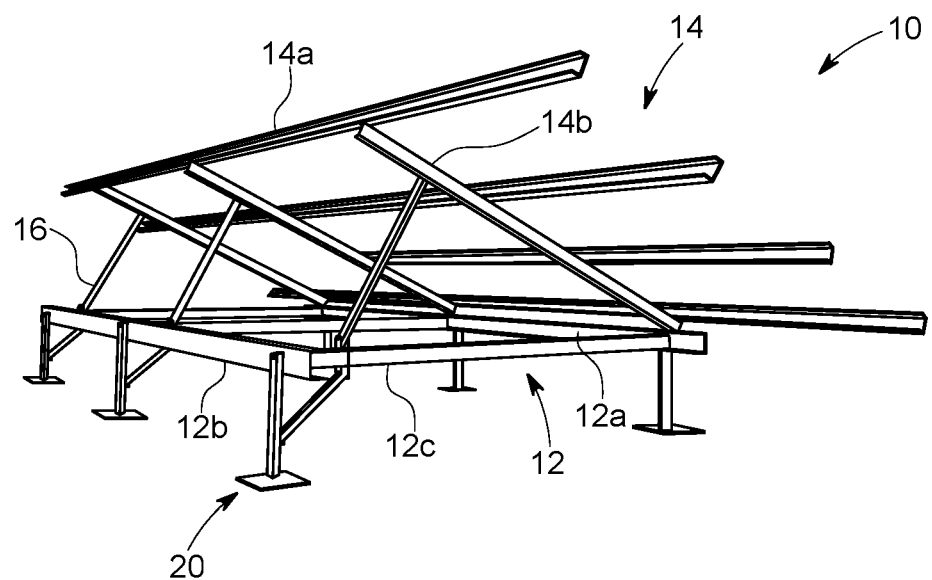
FIG. 2 is a rear view of the transportable modular solar platform of FIG. 1.
Figure 3:
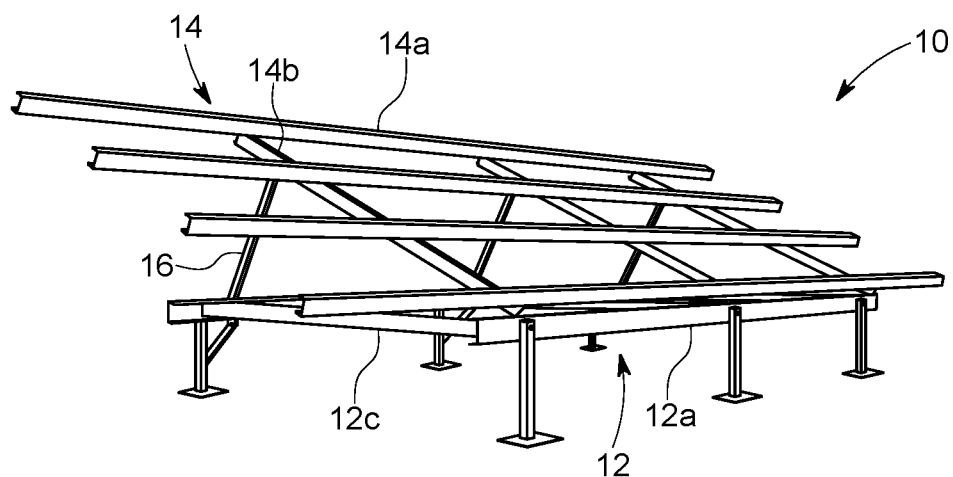
FIG. 3 is a perspective view of the transportable modular solar platform of FIG. 1.
Figure 4:
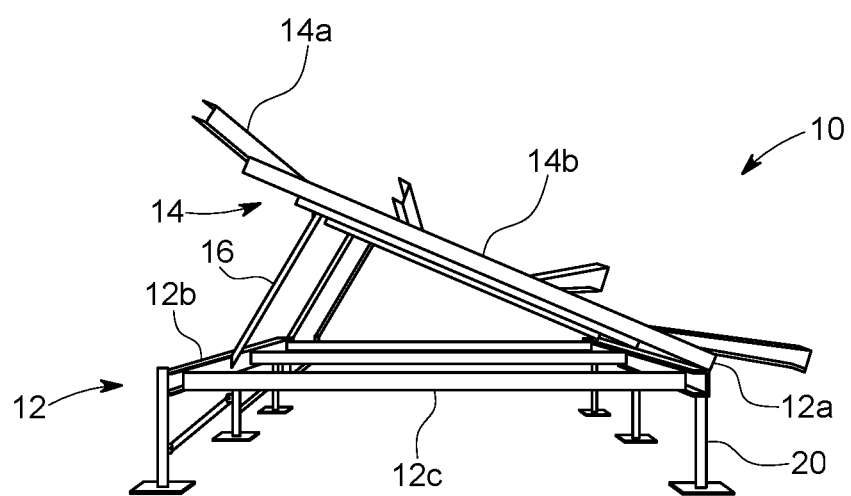
FIG. 4 is a side view of the transportable modular solar platform of FIG. 1.
Figure 5:
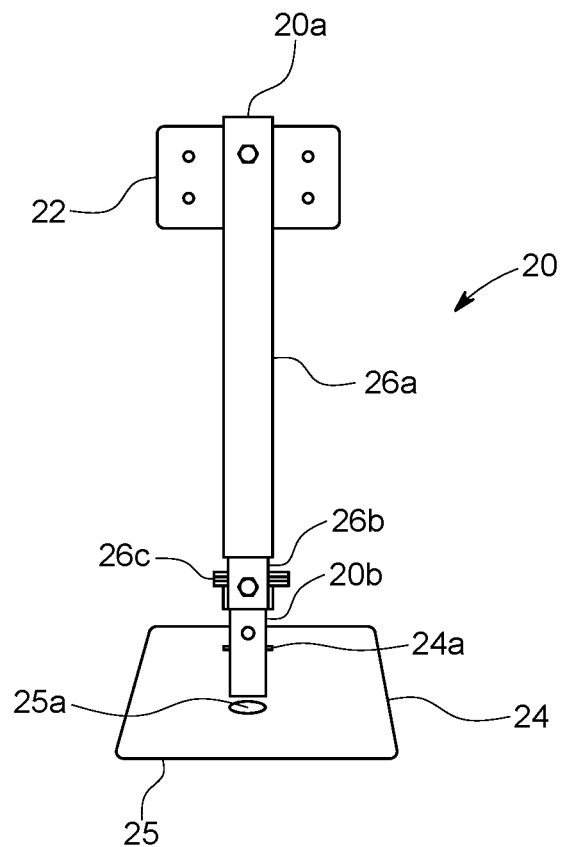
FIG. 5 shows an exemplary embodiment of an independently power adjustable extension leg and shoe plate that may be provided as a component to a transportable modular solar power platform, such as that shown in FIGS. 1-4.

Optionally, the leg 20 may be adjustable, e.g., to change the distance between the mounting bracket 22 and the shoe 24. For example, as shown in FIG. 5, the leg 20 may include an outer member 26a and an inner member 26b, e.g., tubular members, C-rails, and the like, that telescope or otherwise slide relative to one another, e.g., with the inner member 26b sliding at least partially into the outer member 26b. The leg 20 may include one or more connectors, e.g., a pin 26c and corresponding set of holes (not shown) for receiving the pin 26c, for fixing the leg 20 at a desired length. Alternatively, a mechanical system may be provided, e.g., including a rack and pinion, motorized track, and/or other mechanism (not shown), that may be actuated to adjust the length. In the embodiment shown, the shoe 24 includes a post that may be received in or otherwise attached to the lower end 20b and may include one or more mating fasteners, e.g., pin 24a, for removably attaching the shoe 24 to the lower end 20b. Alternatively, the shoe 24 may be substantially permanently attached to the lower end 20b, e.g., by one or more fasteners, e.g., screws, rivets, bolts, and the like, clinching, welding, bonding with adhesive, and the like.

In another alternative, the upper end 20a of the leg 20 may be substantially permanently attached to the frame 12, e.g., attached to the struts 12a, 12b by one or more fasteners, e.g., screws, rivets, bolts, and the like, welding, bonding, and the like. In addition or alternatively, the legs 20 may be pivotally attached to the frame 12, e.g., such that the legs 20 may be rotated between a retracted or storage position, e.g., extending substantially parallel to the struts 12a, 12b, and an extended or installation position, e.g., extending substantially perpendicular to the struts 12a, 12b.

Figure 12A:
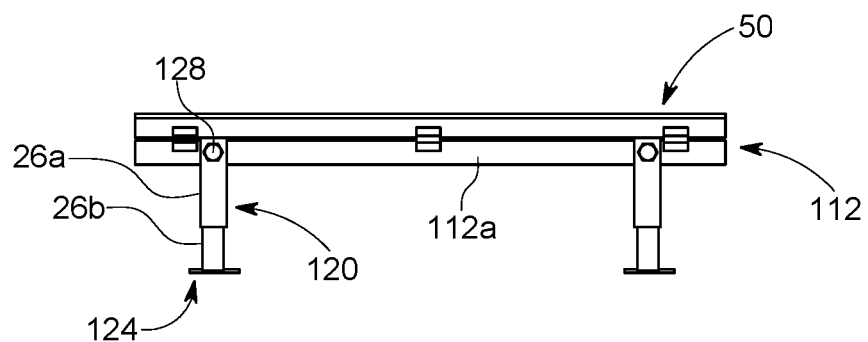
FIGS. 12A-12D are front views of a transportable modular solar platform with a plurality of solar modules stacked flat and extension legs swiveled into position ready for shipment to an installation site.
Figure 12B:
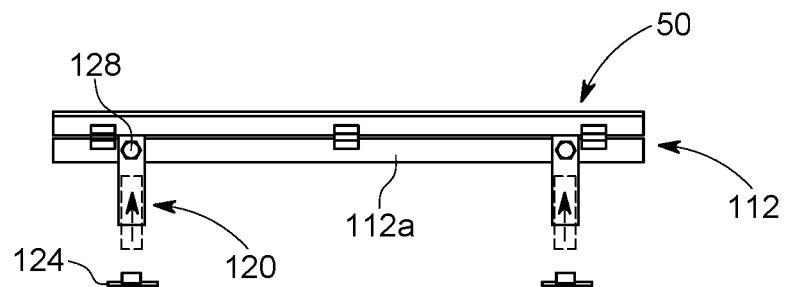
Figure 12C:
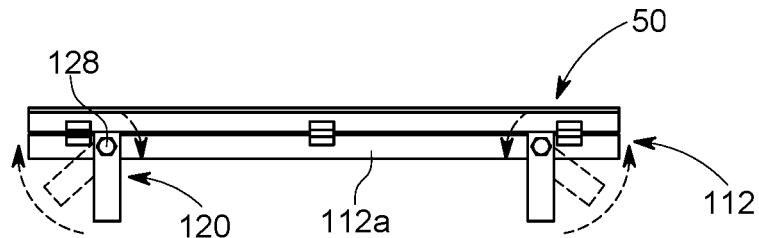
Figure 12D:
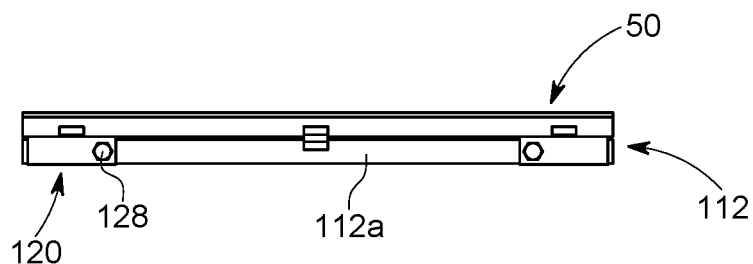

For example, FIGS. 12A-12D show an example of a frame 112 including a plurality of legs 120 that are pivotable between a storage position (FIG. 12D) and an installation position (FIG. 12A). Generally, each leg 120 includes an outer member 126a that is pivotally coupled to a strut 112a at a joint 128, an inner member 126a extendable from the outer member 126a, and a shoe plate 124, as described further elsewhere herein. To store each leg 120 from the installation position shown in FIG. 12A, the shoe plate 124 may be removed (e.g., by removing a pin or other connector, not shown), and the inner member 126b may be retracted at least partially into the outer member 126a, as shown in FIG. 12B. As shown in FIG. 12C, the outer member 126a may then be rotated until positioned along the strut 112a in the storage position, as shown in FIG. 12D. Optionally, the legs 120 and/or strut 112a may include one or more locking features for securing the legs 120 in the storage position. The legs 120 may be returned to the installation position simply by reversing the process.

Figure 6:
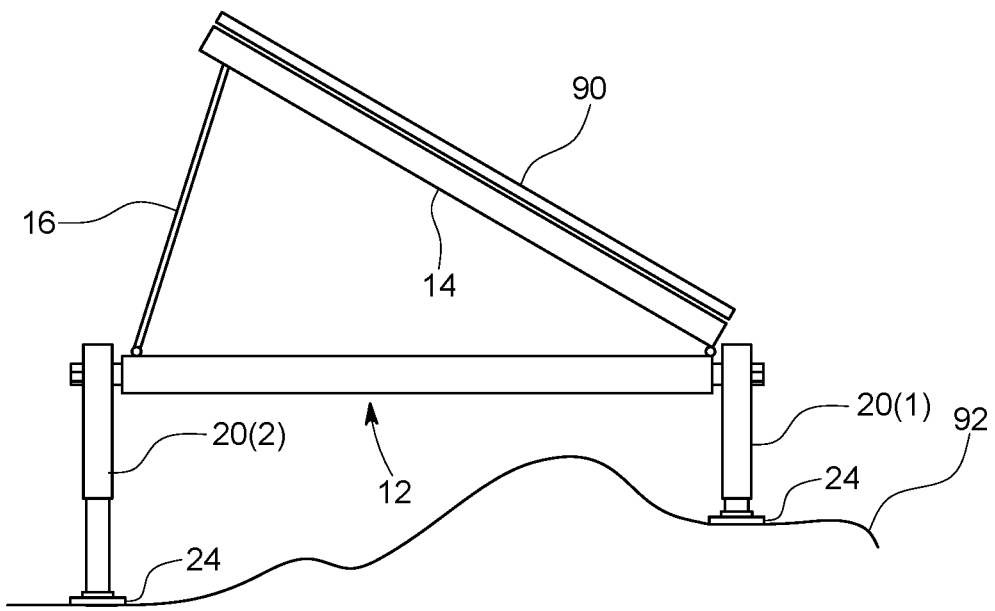
FIG. 6 is a side view of the modular solar power platform of FIGS. 1-4 placed on variable elevation terrain.

Turning to FIG. 6, an exemplary installation is shown in which the frame 12 is oriented substantially horizontally and the rack 14 and solar panel(s) 90 are tilted at an acute tilt angle relative to the frame 12. As shown, the ground 92 is uneven and, consequently, the front leg 20(1) has been retracted to a relatively shorter length and the rear leg 20(2) has been extended to a relatively longer length to ensure that the lower surfaces of the shoes 24 are positioned securely against the surface of the ground 92 and the frame 12 is substantially horizontal. Optionally, the frame 12 may include a motorized self-leveling system (not shown) that may automatically adjust the lengths of the legs 20 to orient the frame 12 substantially horizontally.

Figure 7:
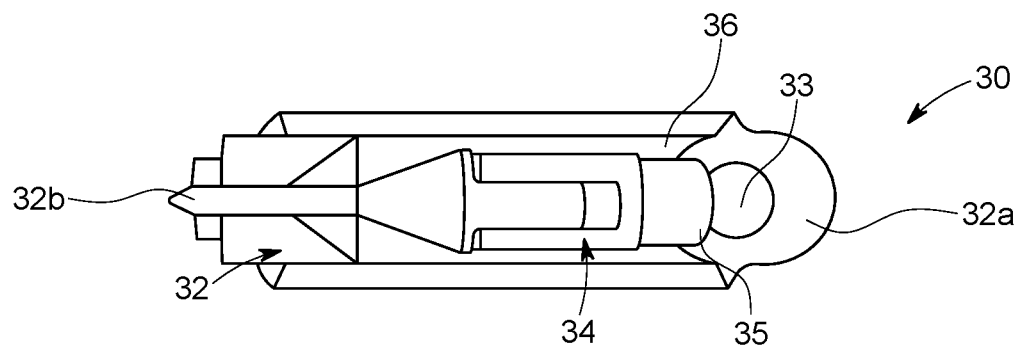
FIG. 7 is a perspective view of an exemplary embodiment of a toggle anchor, with rod and/or cable that may be used as a foundation to anchor a modular solar power platform to any surface condition or terrestrial terrain.
Figure 8A:
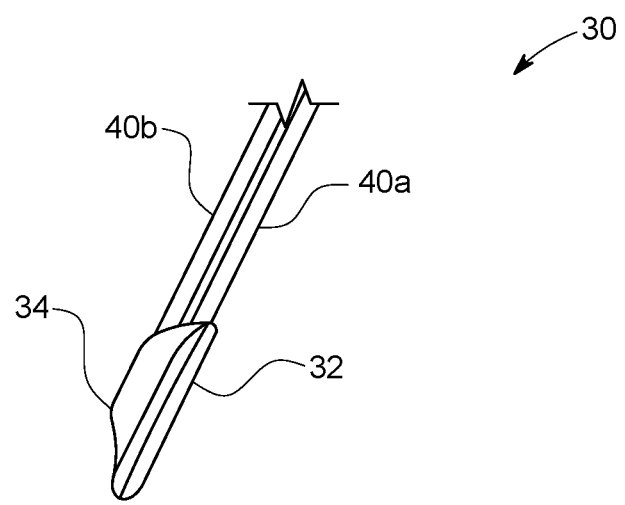
FIGS. 8A-8D show an exemplary method for delivering and deploying a toggle anchor with rod and/or cable within the ground for securing a modular solar power platform to the ground.

During installation, the frame 12 and/or legs 20 may be secured relative to the ground 92, using one or more anchor assemblies, e.g., including a toggle anchor 30 with rod and/or cable, as shown in FIGS. 7 and 8A-8D. For example, turning to FIG. 7, an exemplary embodiment of a toggle anchor 30 is shown that may be used in conjunction with one or more elongate rods 40 and/or cables (not shown). Generally, the toggle anchor 30 includes an anchor or foot portion 32 pivotally coupled to a bolt portion 34 at an intermediate location between first and second ends 32a, 32b of the foot portion 32. The first end 32a of the foot portion 32 may include a tapered, pointed, and/or other shaped tip to facilitate advancement into the ground 92, and the second end 32b includes a socket 33 for removably receiving a rod 40a therein, e.g., as shown in FIG. 8A.

The bolt portion 34 also includes a socket 35 for receiving a rod, cable, or other elongate member 40b therein, also as shown in FIG. 8A. In one embodiment, a cable 40b is substantially permanently attached to the bolt portion 34, e.g., by looping one end of the cable 40b through holes in the socket 35 and permanently attaching the end to an adjacent portion of the cable 40b, e.g., by welding, crimping a sleeve over the cable 40b, and the like. In another embodiment, an anchoring rod 40b may be substantially permanently received in the socket 33, e.g., by one or more of welding, fusing, bonding with adhesive, interference fit, and the like. In a further alternative, the sockets 33, 35 may be sized to slidably receive anchoring rods 40 therein. Alternatively, the sockets 33, 35 and/or anchoring rods 40 may include threads or other features (not shown) for removably securing anchoring rods 40 in the sockets 33, 35.

Figure 8B:
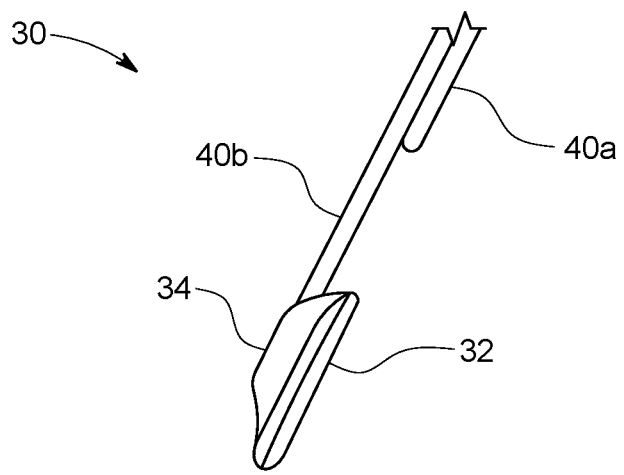
Figure 8C:
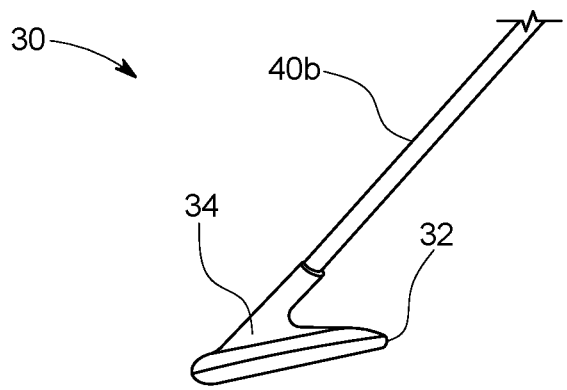
Figure 8D:
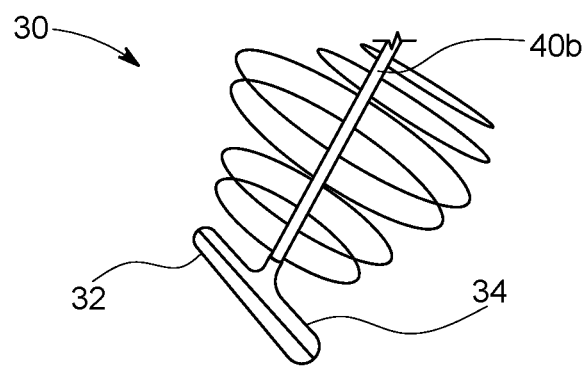

The bolt portion 34 may pivot relative to the foot portion 32 between a delivery or low profile orientation where the bolt socket 35 is disposed adjacent the foot socket 33, e.g., as shown in FIGS. 8A and 8B, to facilitate introduction of the toggle anchor 30, and a deployed orientation where the bolt portion extends transversely, e.g., substantially perpendicular to a length of the foot portion 32, e.g., as shown in FIG. 8D. As best seen in FIG. 7, the foot portion 32 may include a recess 36 along one side that extends partially between the first and second ends 32a, 32b for receiving the bolt portion 34 in the low profile orientation, e.g., to minimize a profile of the toggle anchor 30 during advancement into the ground.

During installation, a driving rod 40a may be inserted, e.g., threaded, into the socket 33 and the bolt portion 34 is positioned in the low profile orientation shown in FIG. 8A with a cable 40b attached to the socket 35 extending substantially parallel to the rod 40a. Alternatively, the cable 40b may be replaced with a rigid anchoring rod, similar to the driving rod 40a. The anchor 30 may then be directed into the ground 92 at a desired location relative to the frame 12, e.g., using handheld tools, e.g., a portable percussion hammer, to drive the driving rod 40a, and consequently, the toggle anchor 30 and cable 40b (or anchoring rod), a desired depth into the ground 92 with a second end of the driving rod 40a and cable 40b remaining exposed outside the ground 92. Once the target depth is reached, the driving rod 40a is unthreaded and/or otherwise removed from the socket 33 in the foot portion 32, as shown in FIG. 8B, and out of the ground 92. Then, as shown in FIG. 8C, the exposed second end of the cable 40b (or anchoring rod) is pulled to cause the foot portion 32 to engage with the surrounding soil and pivot to the deployed orientation, e.g., substantially perpendicular to the cable 40b (or anchoring rod), as shown in FIG. 8D. Once the anchor 30 is properly deployed, the exposed end of the cable 40b (or anchoring rod) may extend out of the ground a desired distance. Optionally, any undesired length of the exposed end of the cable 40b (or anchoring rod) protruding from the ground may be cut off or otherwise removed.

Figure 9A:
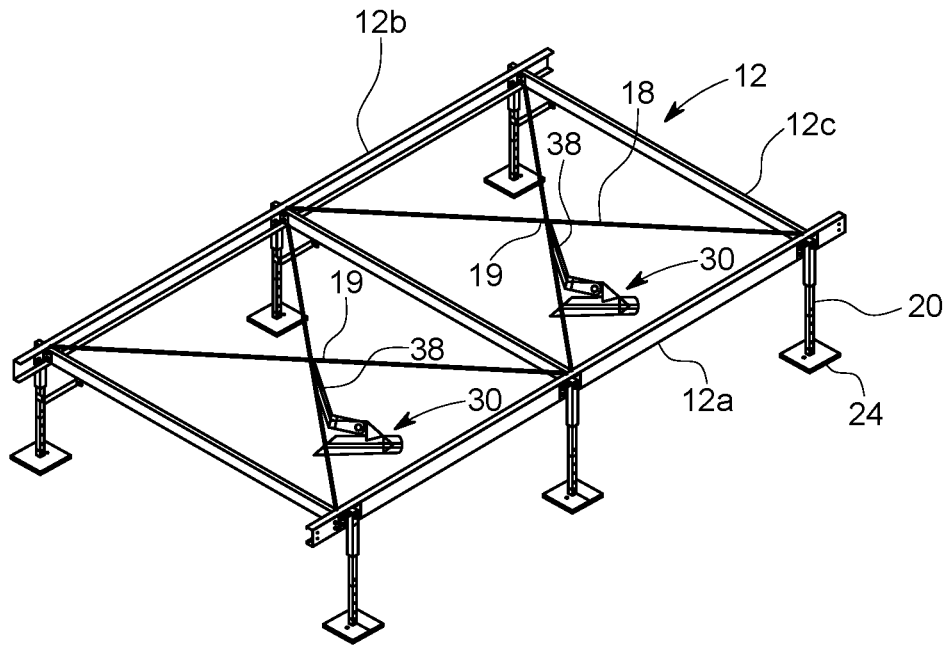
FIG. 9A is a perspective view of a transportable modular solar platform showing an exemplary configuration of toggle anchors with rod and/or cable attached to the platform for securing the platform to the ground at a site.
Figure 9B:
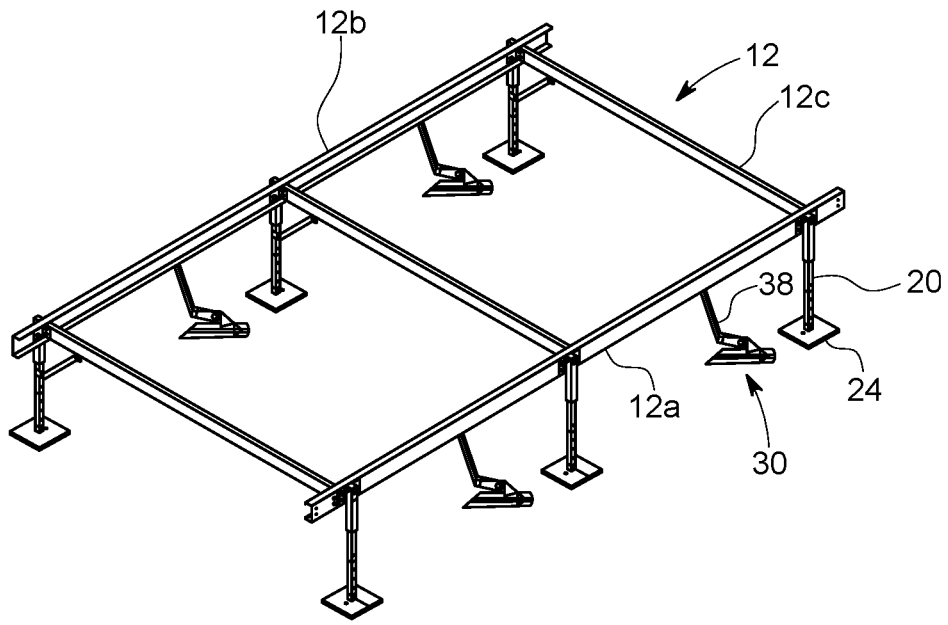
FIG. 9B is a perspective view of a transportable modular solar platform showing another exemplary configuration of toggle anchors with rod and/or cable attached to the modular unit.

The exposed end of the cable 40b (or anchoring rod) may be attached to the frame 12 in a desired manner to secure the frame relative to the ground 92. Alternatively, if an anchoring rod is used instead of the cable 40b, a cable may be attached to the exposed end of the anchoring rod and attached to the frame 12. For example, as shown in FIGS. 10-1C, the cable 40b (or anchoring rod) may be inserted through the shoe 24 and coupled to the leg 20. Alternatively, as shown in FIG. 9A, the frame 12 may include a plurality of horizontal cables 18 extending between the struts 12a, 12b in a diagonal arrangement such that pairs of cables 18 intersect at locations 19. Toggle anchors 30 (shown schematically) may be driven into the ground below the intersection locations 19 and cables 38 may be attached to the exposed cable or anchoring rod (not shown) and the locations 19. In another alternative, shown in FIG. 9B, toggle anchors 30 may be driven into the ground at locations below the struts 12a, 12b of the frame 12, and cables 38 may be attached between the exposed anchoring rods (not shown) and the struts 12a, 12b.

Figure 10A:
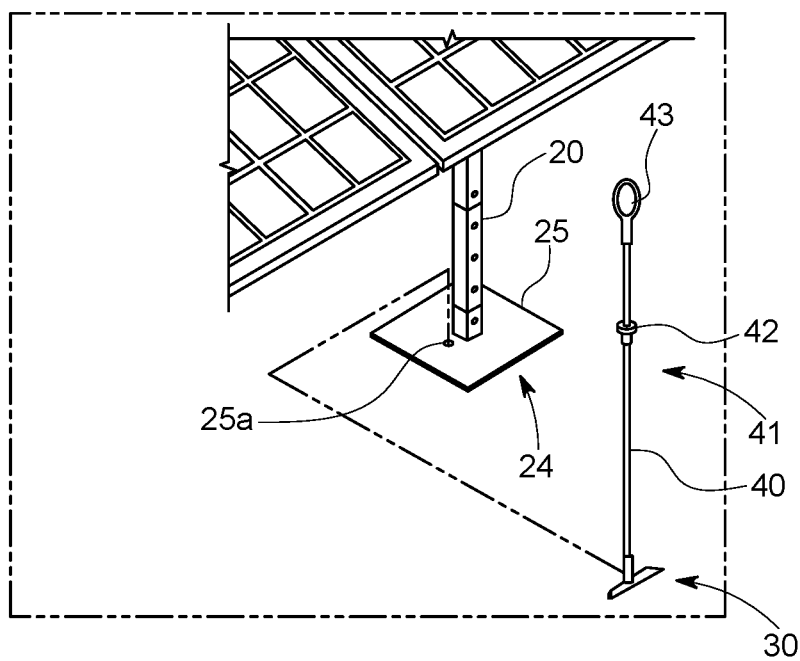
FIG. 10A is a detail showing a method for securing an extension leg of a modular unit to a toggle anchor with rod and/or cable deployed within the ground below the extension leg.

Turning to FIG. 10, the toggle anchors 30 may be driven into the ground at locations below one or more of the extension legs 20 and the exposed ends of the cables 40b (or anchoring rods) may be attached to the shoes 24 and/or to the extension legs 20. For example, FIG. 10A shows an exemplary installation method for securing the shoe 24, and consequently, the extension leg 20, relative to a toggle anchor 30 deployed below the leg 20. As best seen in FIG. 5, the shoe 24 includes a horizontal shoe plate 25 including one or more holes, e.g., a hole 25a, adjacent the leg 20 through which the exposed end of the cable 40 may be inserted after delivering the anchor 30. A fastener 42 may be advanced over the exposed end 41 of the rod 40 and engaged with the shoe 24 to apply a desired tension on the cable or rod 40. For example, the fastener 42 may include a ratchet or other one-way mechanism (not shown) that may allow the fastener 42 to be advanced downwardly over the cable or rod 40 while preventing upward removal. Alternatively, if a rod is used instead of a cable for the anchor member 40, the fastener 42 and rod 40 may include cooperating threads (not shown) that allow the fastener 42 to be threaded over the exposed end 41 of the cable 40 until the fastener 42 engages the shoe 24.

Once the fastener 42 contacts the shoe plate 25, any further advancement and/or retraction of the cable or rod 40 applies a tensile force along the cable or rod 40 between the anchor 30 and the shoe plate 25. Thus, the fastener 42 may be advanced (e.g., ratcheted or threaded) relative to the cable or rod 40, as needed, to remove any slack and/or apply a desired tension pulling upwardly on the cable or rod 40.

Optionally, the second end of the cable or rod 40 may include a loop 43 or other feature that may be engaged with the leg 20 to further attach the cable 40. For example, the leg 20 may include one or more pins extending outwardly (not shown) over which the loop 43 may be placed once the fastener 42 is advanced to a desired distance.

Figure 10B:
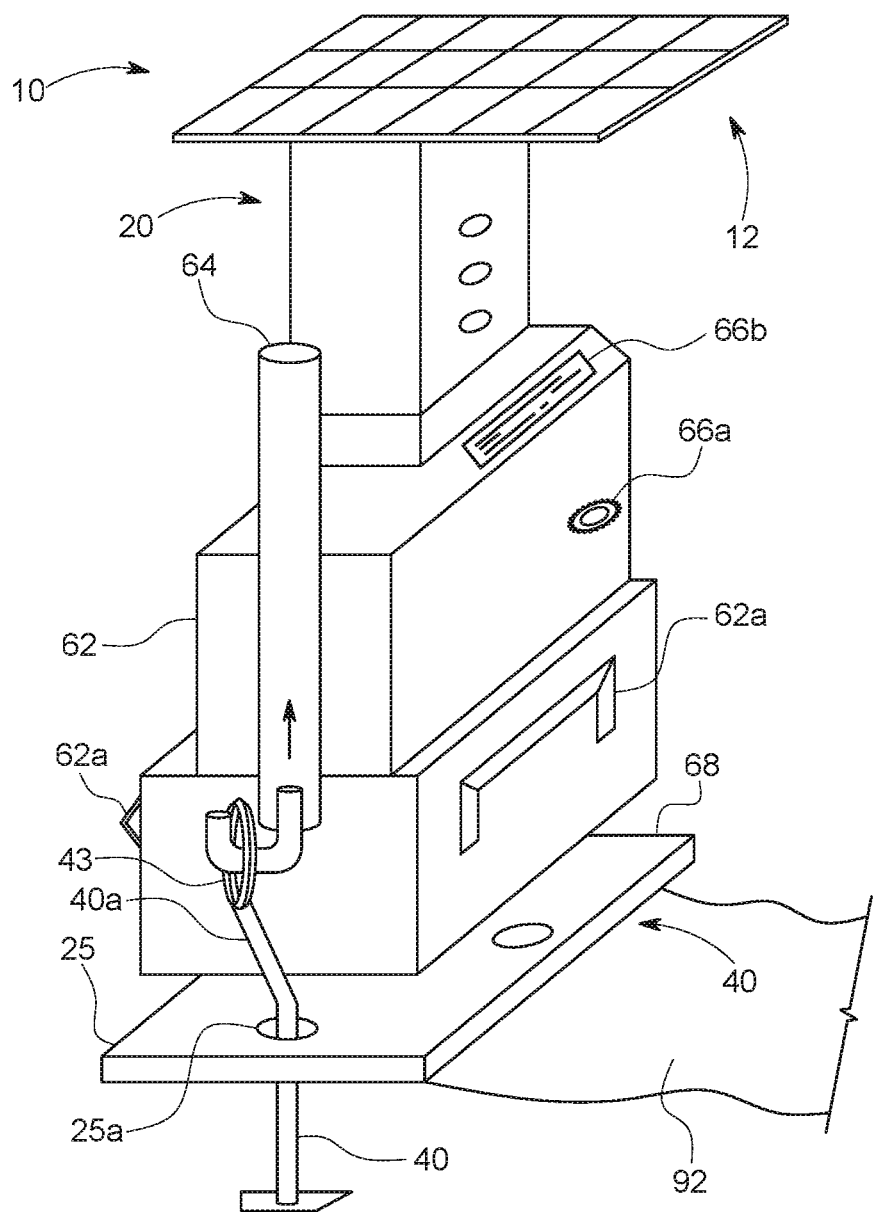
FIG. 10B is a detail showing a motorized load tension device that may be provided on each extension support leg to perform a load lift (tension) test for each anchor with rod and/or cable in real time soil conditions.

Turning to FIG. 10B, before securing the cable or rod 40 to the leg 20 and/or shoe 24, a load lift (tension) test may be performed to ensure that the toggle anchor 30 and cable or rod 40 satisfy engineering, regulatory, and/or other requirements to provide an earth-anchoring foundation for the modular unit 10. In one embodiment, a single (or multiple) portable load test device 60 may be provided that may be used to test each anchor 30 and cable or rod 40 during installation. Alternatively, each extension leg 20 and/or shoe 24 may include an integral load test device (not shown), e.g., temporarily or permanently mounted to each extension leg 20. As shown in FIG. 10B, the load test device 60 includes a housing 62 shaped to be positioned around and/or otherwise adjacent the extension support leg 20 on the shoe plate 25 including one or more handles 62a, e.g., to facilitate carrying and/or position the device 60 such that the device 60 may be coupled to the cable or rod 40 to automatically test the anchor 30 and cable or rod 40. The load test device 60 may include a motorized actuator, e.g., lead screw 64 carrying a hook 64a or other element that may receive a loop 43 of the cable or rod 40 thereon, e.g., to pull upwardly on the cable or rod 40 to apply tension to the anchor 30 deployed below the extension leg 20 as the hook 64a is directed upwardly along the lead screw 64.

In addition, the load test device 60 may include a controller, e.g., including one or more processors and/or memory (not shown), a user interface 66, and, optionally, a communication interface 68. For example, the load test device 60 may include an input device 66a, e.g., including one or more buttons, knobs, keypad, and the like, allowing a user to activate the device 60 and/or control operation of the lead screw 64, e.g., to set a force applied to the cable or rod 40. In addition, the device 60 may include an output device 66b, e.g., a display that may present information to the user. In one embodiment, the user interface 60 may include a touchscreen (not shown) that may allow a user to present one or more menus and/or graphical interface that allows the user select information, set parameters, and/or otherwise control operation of the device 60. The optional communication interface 68 may include a data port, e.g., such that the user may couple an external electronic device, e.g., portable computer, tablet, phone, flash drive, etc., to the device 60, e.g., to receive data and/or control operation of the device 60. In addition or alternatively, the communication interface 68 may include a wireless communications device, e.g., transmitter and/or receiver for transmitting data to and/or receiving instructions from a remote location, e.g., via a local wireless network, a telecommunications network, and the like. In another option, the device 60 may include clock and/or GPS device (not shown) such that the controller may associate a time stamp, GPS coordinates, and/or other information with test results obtained using the device 60, as described elsewhere herein.

During use, the load test device 60 may be placed on the shoe plate 25 and mechanically coupled to the cable and/or rod 40 extending from ground, e.g., by placing a loop 43 around the hook 64a and activated, e.g., by pressing a button or other actuator 66a, such that the motorized mechanism 64 automatically applies a predetermined tension to the anchor 30. In an exemplary embodiment, the controller and motorized mechanism may apply a present tension to the anchor 30 and cable or rod 40, e.g., 1.5 times the design load for the modular unit 10 supported by the extension leg 20. Thus, the load test device 60 may automatically confirm under real-time soil conditions that the anchor 30 with rod and/or cable 40 satisfies the applicable code and/or other requirements for the modular unit 10 for securing the modular unit to the ground 92. The resulting load data, optionally along with other information, e.g., a time stamp, GPS coordinates, operator identifier, and the like may be stored in memory of the device 60 and/or communicated externally, e.g., to a device coupled to the data port 68 and/or transmitted wirelessly.

Upon completion of the test, the hook 64a may automatically return to its lower position to remove the tension load, and the loop 43 may be removed from the hook 64a. The cable or rod 40 may then be secured to the extension leg 20 and/or shoe 24, e.g., using a fastener (not shown) advanced over the cable or rod 40 against the shoe plate 25 over the hole 25a and/or securing the loop 43 over a pin (also not shown) on the extension leg 20, as described elsewhere herein.

In an alternative embodiment, a manual load test device (not shown) may be provided. For example, the load device may include a tripod or other base to which a come-along hoist or other actuator is mounted. The user may couple the cable or rod 40 to the actuator, and manually apply the tension. The load test device may include a device that measures the tension and provides an output to the user, e.g., a mechanical or electronic scale.

This method may be repeated for each base plate (shoe plate) 20, thereby securing the modular platform 10 relative to the ground 92 using the anchors 30. Optionally, as the anchor foundations 30 are utilized to secure the platform 10 to the ground 92, each anchor 30 may be tensioned independently to set the binding/toggle mechanism and obtain a tensioning value that may be recorded by the installer. This tensioning event may occur in real time soil conditions, and the data for each may be captured in a non-destructive manner while seating the anchors 30 using an appropriate tension to specified load conditions in real time soil conditions. This data may be made available to personnel in virtual real time through up loading of data to the "cloud" or other WAN/LAN based application in order to have a record of the anchor tensioning value at each anchor location, as described elsewhere herein.

For example, the load test device may include a communications interface, e.g., a Wi-Fi (e.g., Bluetooth) or telecommunications interface that may communicate the results of the test, e.g., to an operator device at the installation site, or remotely, e.g., to a storage or relay device. In one embodiment, the load test device may automatically associate other data with the test results, e.g., such that test results may be uniquely associated with a particular modular unit and/or particular leg of a modular unit. Such data may include one or more of GPS coordinates of the modular unit and/or leg, e.g., using an internal GPS in the load test device, a time stamp identifying the time and date of the test, an identifier corresponding to the operator and/or installer present during the test, and the like. Alternatively, the operator may input the results and/or other data into a portable device after each test, which may be stored and/or communicated to a remote location.

Figure 14:
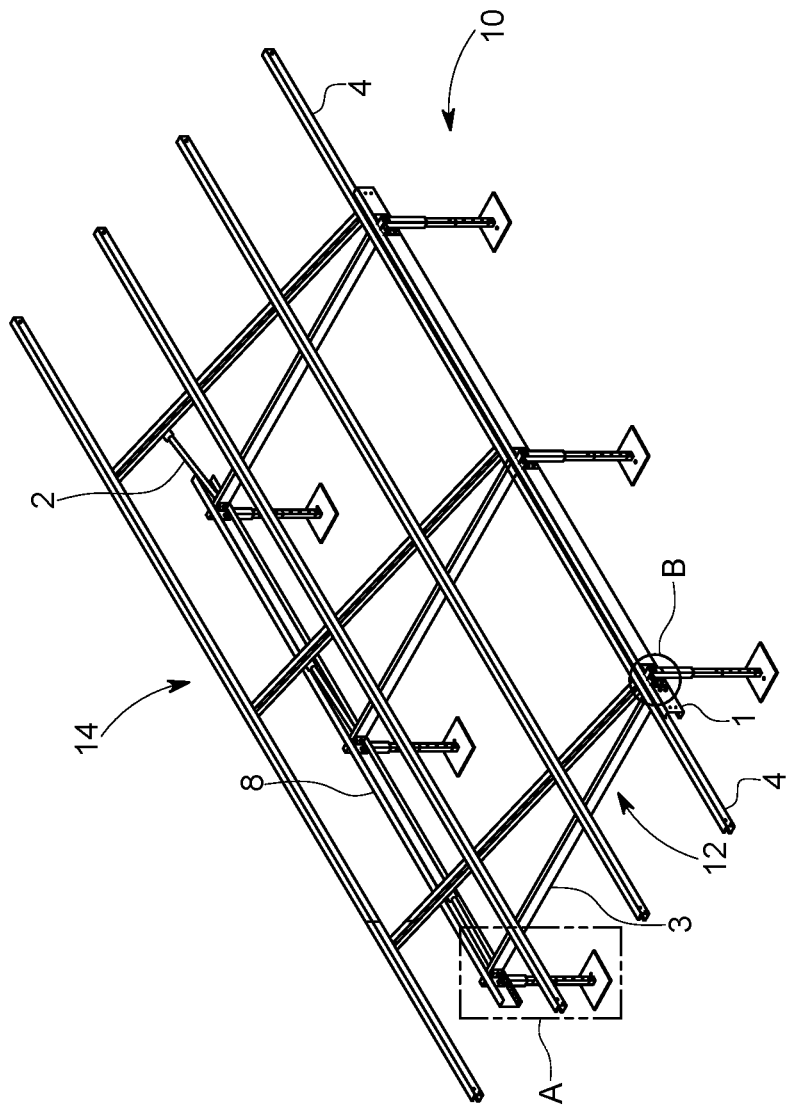
FIGS. 14-15J show an exemplary method for assembling and/or installing a modular solar power platform (modular unit).
Figure 15A:
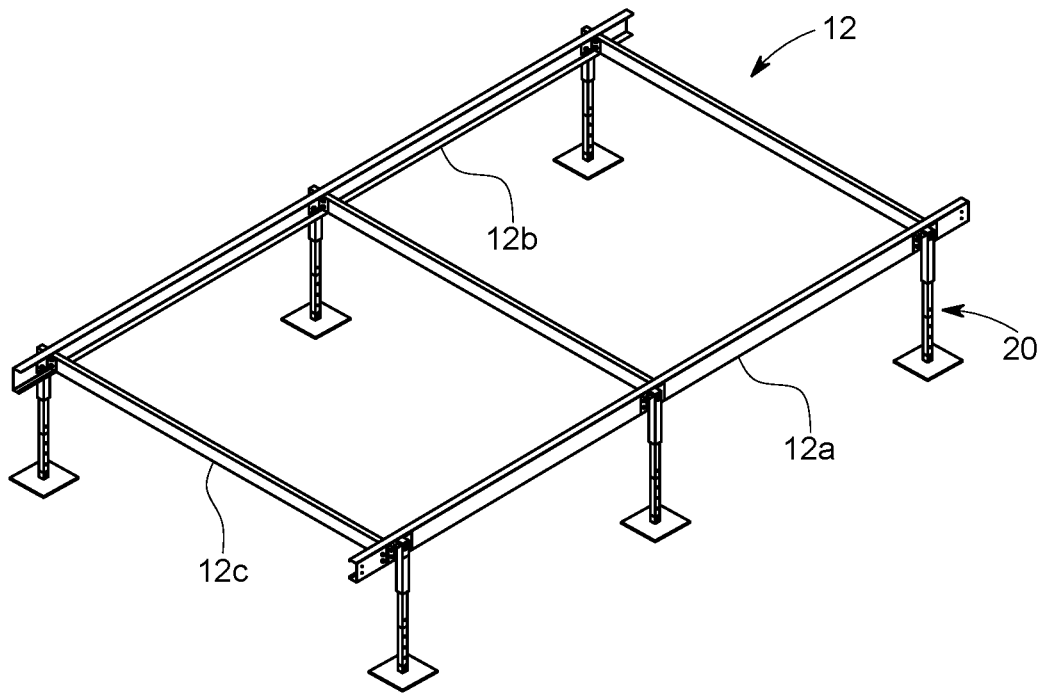
Figure 15B:
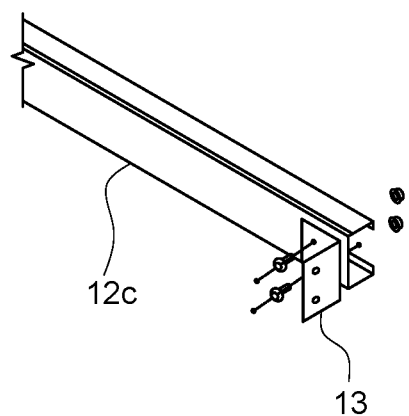
Figure 15C:
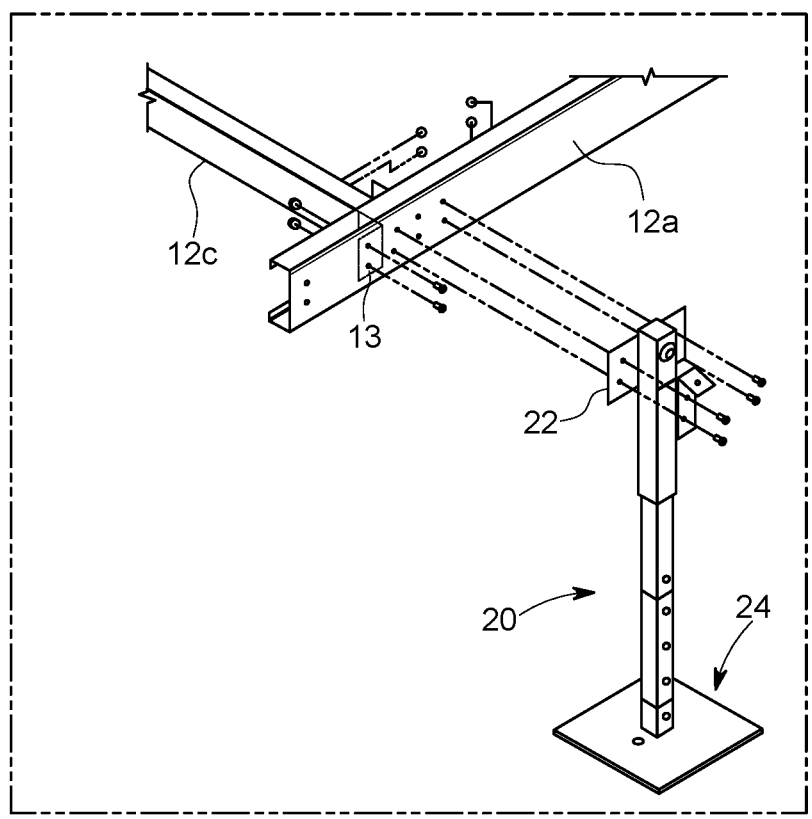

Turning to FIG. 14, the platform 10 may be assembled at an installation site or may be assembled in advance, e.g., at a manufacturing facility or other preparation location before delivery to the installation site. For example, in one embodiment, all of the components of the frame 12 and rack 14 may be delivered unassembled and assembled using conventional tools and methods. For example, turning to FIGS. 15A-15C, the struts 12a-12c and legs 20 for the frame 10 may be manufactured separately and assembled together, e.g., using one or more fasteners and/or clinching, as described elsewhere herein. For example, brackets 13 may be attached to the ends of mid-struts 12c, e.g., by a plurality of nuts and bolts (FIG. 15B), and the brackets 13 may then be attached to the front and rear struts 12a, 12b, e.g., using a plurality of nuts and bolts (FIG. 15C). Similarly, the mounting brackets 22 of the legs 20 may be attached to the front and rear struts 12a, 12b, e.g., using a plurality of nuts and bolts (FIG. 15C). In the exemplary embodiment shown in FIGS. 14 and 15A-15C, a leg 20 may be provided at the ends and midpoints of the front and rear struts 12a, 12b. It will be appreciated that the legs at the midpoints may be omitted or additional intermediate legs provided, as desired.

Figure 15E:
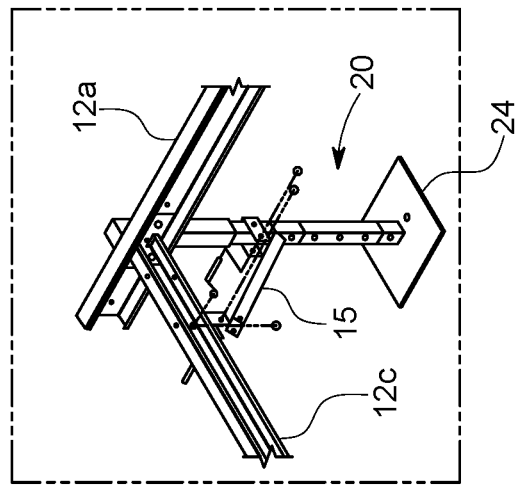
Figure 15D:
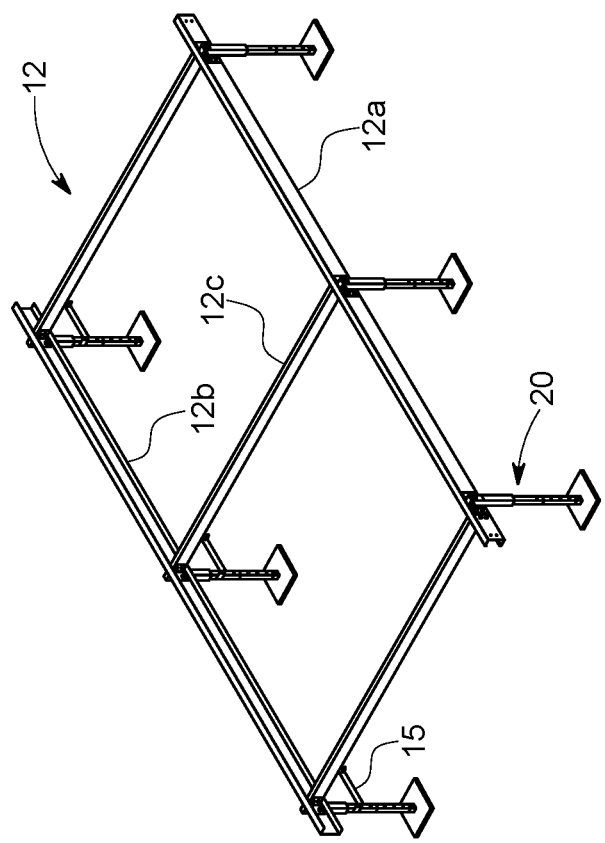

Optionally, as shown in FIGS. 15D and 15E, cross-braces 15 may be attached between the mid struts 12c and legs 20 to further support the legs 20 relative to the frame 12. For example, as shown in FIG. 15E, a plurality of bolts, may be directed through corresponding holes in the mid struts 12c and the outer member 26a of the legs 20 and secured with nuts to support the legs 20 substantially perpendicular relative to the frame 12.

Similarly, as shown in FIGS. 15F-15J, the components of the rack 14 may also be delivered unassembled and assembled using conventional tools and methods. For example, turning to FIGS. 15F-15I, the supports 14b and back braces 16 of the rack 14 may be attached to the assembled frame 12, e.g., using one or more fasteners and/or clinching. For example, opposite ends of the back braces 16 may include brackets 16a, 16b that may be pivotally coupled to one end of the supports 14b (FIG. 15G) and the mid struts 12c (FIG. 15H), respectively, and the other end of the supports 14b may be attached to mounting brackets 17 attached to the front strut 12a (FIG. 15I), to secure the supports 14b relative to the frame 12.

Figure 15J:
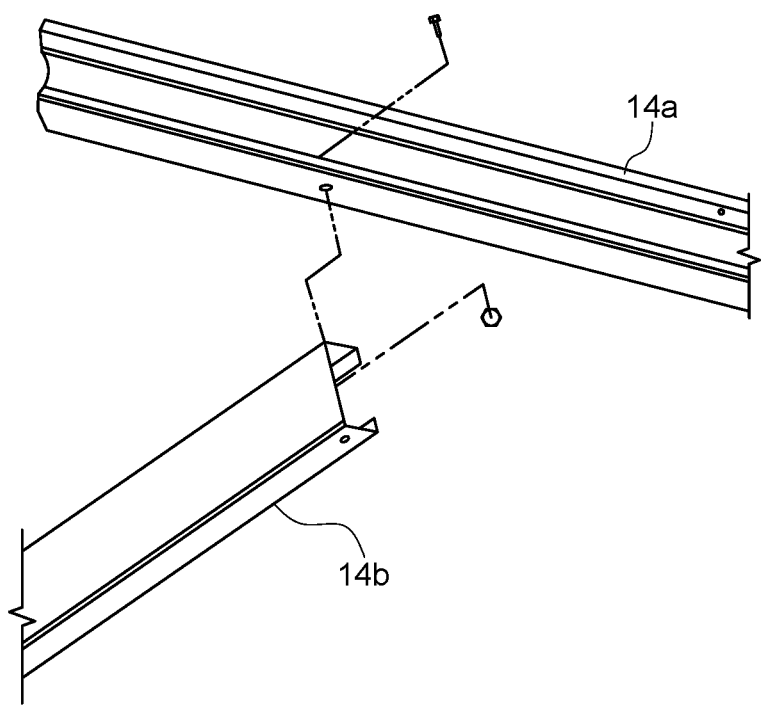

As shown in FIG. 15J, the rails 14a may then be attached to the supports 14b, e.g., using one or more nuts and bolts (or other fasteners and/or clinching, as described elsewhere herein), e.g., such that the rails 14a extend the supports 14b substantially parallel to the front strut 12a of the frame 12, e.g., as shown in FIG. 14. With the platform 10 assembled, one or more anchors (not shown) may be driven into the ground at the installation site and the exposed cables may be attached to the platform 10, e.g., to the legs 20, as described elsewhere herein, to secure the platform 10 relative to the ground at the installation site.

Figure 11A:
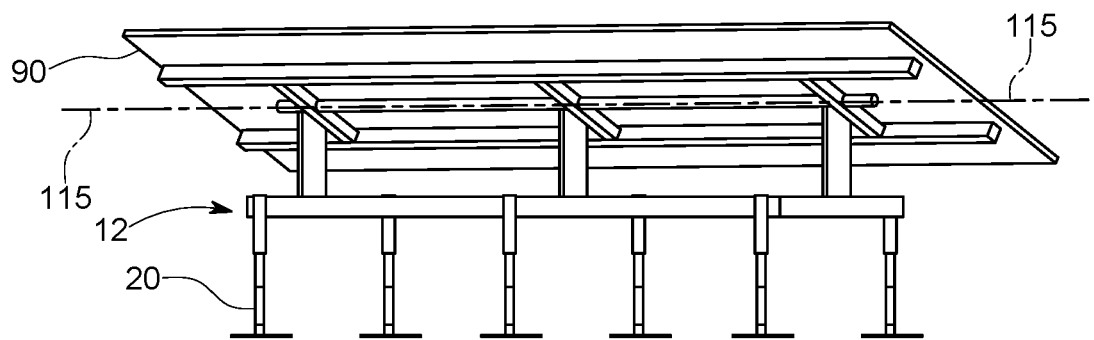
FIGS. 11A-11E are various views of an exemplary embodiment of single axis tracker components with east and west facing functionality hosted by a transportable, multi-configurable, modular solar platform in accordance with the systems and methods herein.
Figure 11B:
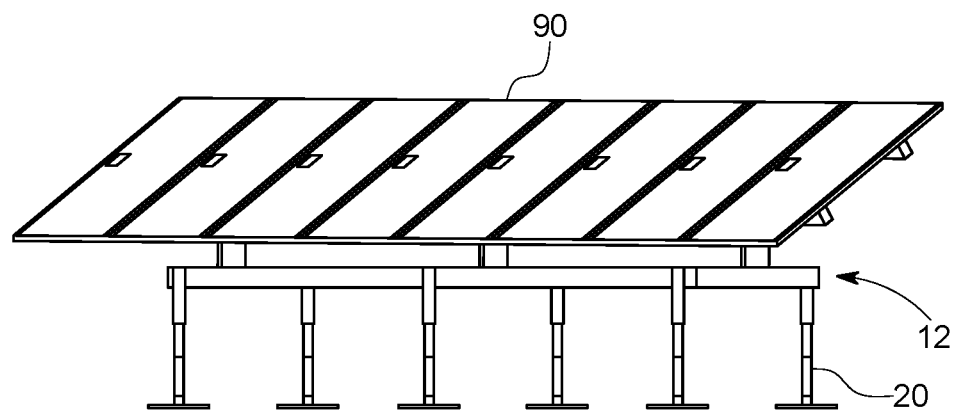
Figure 11C:
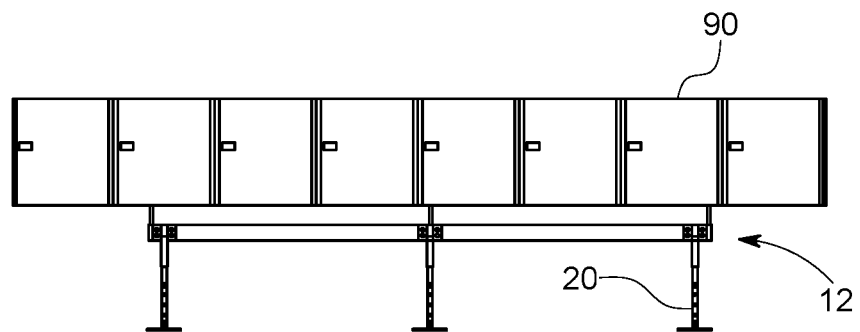
Figure 11D:
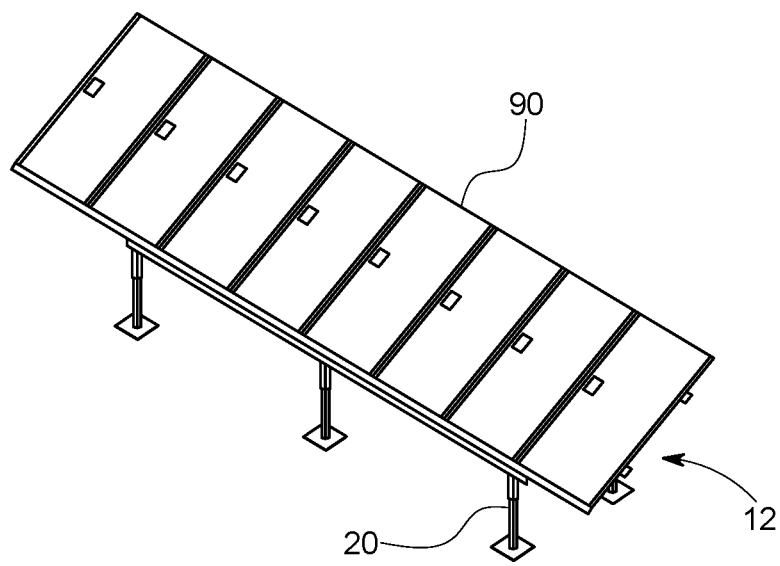
Figure 11E:
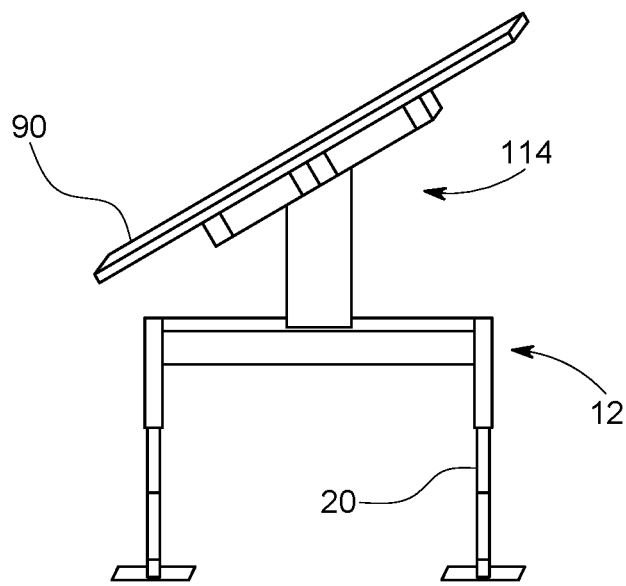
Figure 11F:
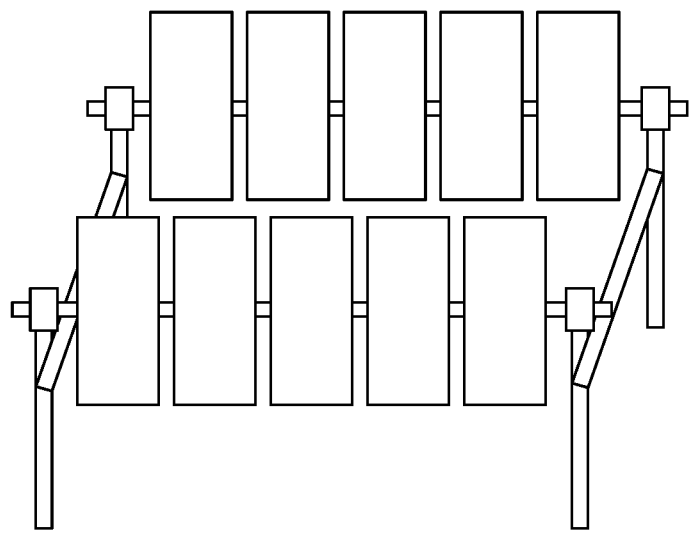
FIG. 11F is a front view of an exemplary embodiment of multiple axis tracker components with east and west facing functionality and hosted by a transportable, multi-configurable, modular solar platform in accordance with the systems and methods herein.

One or more solar panels 90 may then be attached to the rails 14a, e.g., using one or more clips, fasteners, or other mechanisms, as described elsewhere herein, e.g., as shown in FIG. 10. Alternatively, other racks may be mounted to the frame 12, e.g., a pivotable rack 114 such as that shown in FIGS. 11A-11E, to which a plurality of solar panels 90 may be mounted. In this alternative, the rack 114 may be pivotable around a horizontal axis 115 to adjust the incline of the solar panels 90, e.g., to set the incline angle based on the location of the sun relative to the installation site and/or to allow the incline angle to be changed using a motorized actuator that automatically adjust the incline angle based on the time of day and/or other parameters, as described elsewhere herein. In a further alternative, other rack systems may be mounted to the frame 12, e.g., having single axis or multiple axis pivoting capabilities, such as the rack shown in FIG. 11F.

Figure 13A:
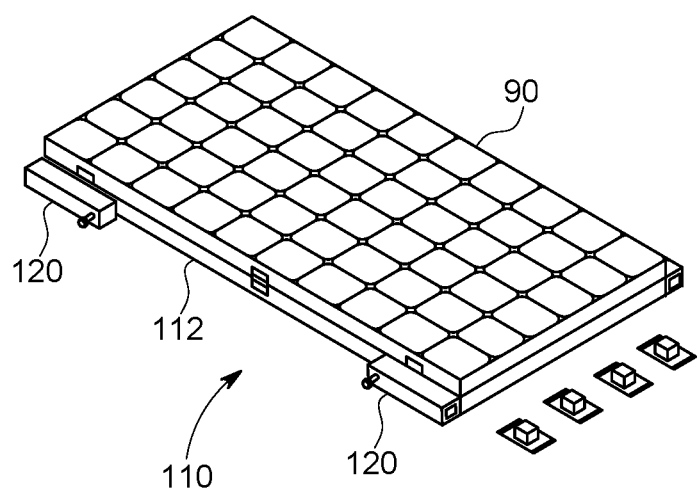
FIG. 13A is a perspective view of an exemplary embodiment of a transportable modular solar platform with a plurality of solar modules stacked flat and extension legs swiveled into position.
Figure 13B:
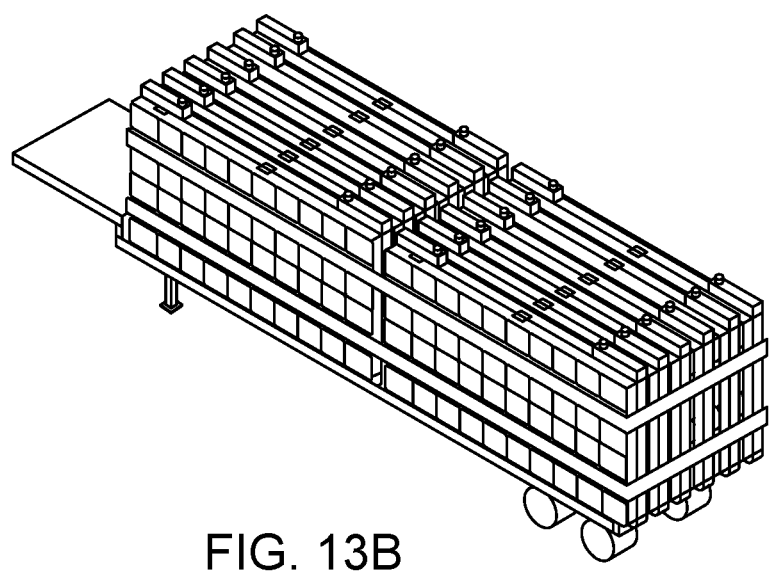
FIGS. 13B-13D are perspective, rear, and top views, respectively, showing a plurality of vertically stacked modular solar platform units with a plurality of solar modules loaded onto a transport vehicle ready for shipment to an installation site.
Figure 13C:
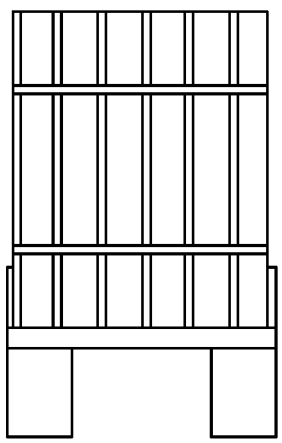
Figure 13D:
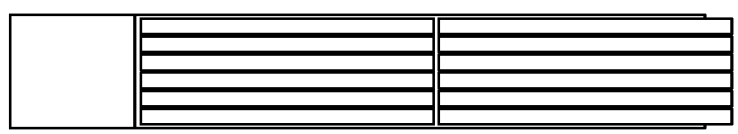

Alternatively, the frame 12 and rack 14 (or any of the other racks described herein) may be preassembled with one or more solar panels, and the final assembly delivered to the installation site. Thus, in this alternative, a plurality of independent modular units may be delivered to an installation site, which may be secured using one or more toggle anchors with rods and/or cables as an earth-anchoring foundation. Optionally, in this alternative, the frame 12 may include legs 20 that are movable between storage and extended positions, as described elsewhere herein. For example, FIG. 13A shows an exemplary embodiment of a platform 110 carrying one or more solar panels 90. As described previously, the platform 110 includes a frame 112 including a plurality of legs 120 that are movable between the storage position shown for delivery to an installation site, e.g., nested together with other platforms, as shown in FIGS. 13B-13D.

Once the platforms are delivered to the installation site, the legs 120 may be directed to the extended position (e.g., as shown in FIG. 12A), anchors may be driven into desired locations, and cables from the anchors attached to the legs, as described elsewhere herein. Although each modular unit may be secured independently using its own set of one or more toggle anchors with rods and/or cables, the modular units may be adjusted as necessary to ensure that the solar panels mounted to the modular units are flush or otherwise oriented relative to one another to ensure efficient operation of the solar panels. For example, the extension legs 120 and/or frames may provide sufficient adjustability even in uneven terrain to ensure that the solar panels are properly oriented relative to one another.

Optionally, each modular platform 10 may include a powered control mechanism (not shown) which may be enclosed in the rear extension leg used as a support frame for adjusting the solar module frame 12 and/or rack 14, e.g., to adjust the angle of the plane of the solar panels. For example, the mechanism may include a user interface that a user in the field may use to manually activate a motorized actuator coupled to the rack 14 to adjust the angle of the panels mounted to the rack 14. Alternatively, the control mechanism may include a communications interface that may receive instructions remotely, whereupon the motorized actuator may be adjust the angle of the solar panels as desired, e.g., based on time of year, time of day, and/or other factors.

Figure 16A:
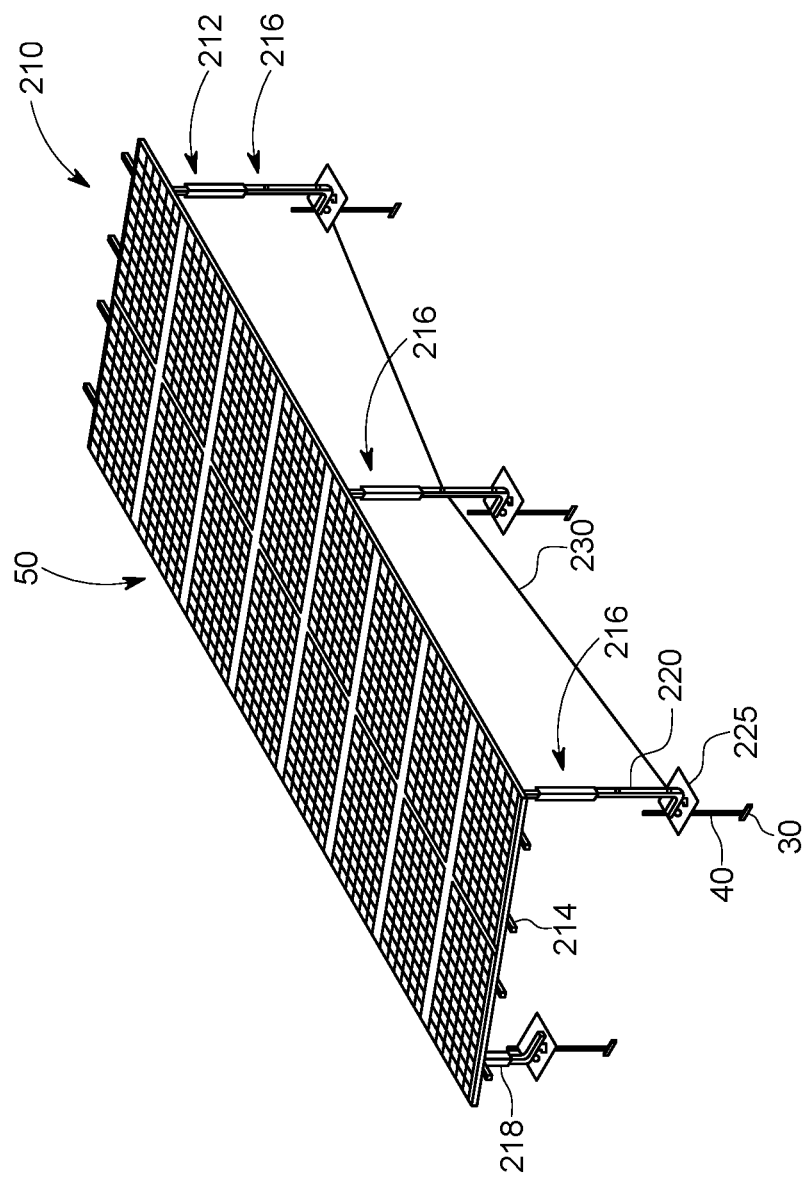
FIGS. 16A and 16B are perspective and side views, respectively, of another exemplary embodiment of a transportable, multi-configurable modular solar power platform with fixed solar panels mounted to the platform.
Figure 16B:
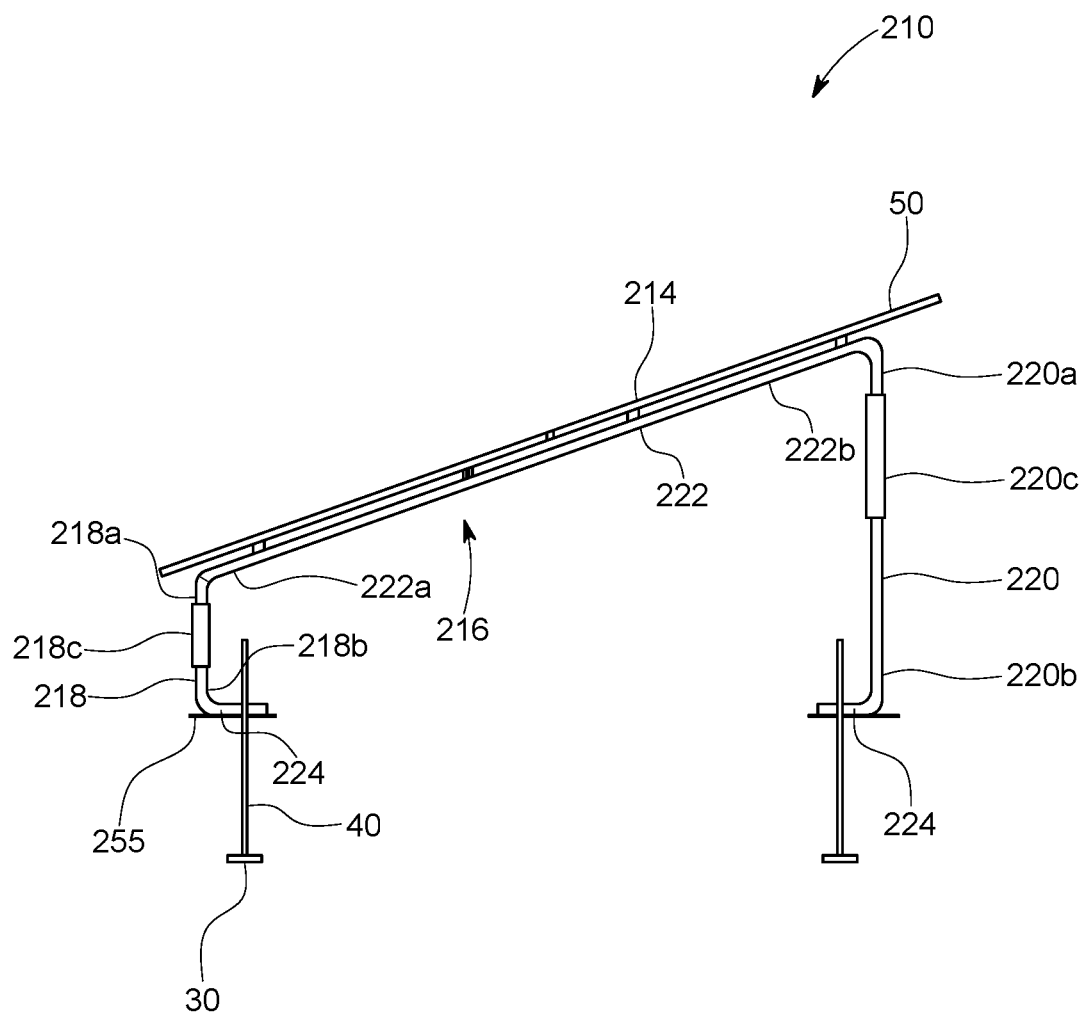

Turning to FIGS. 16A and 16B, another example of a modular, multi-configurable solar power platform 210 is shown that includes a frame 212, support struts 214, and a plurality of solar panels 50, generally similar to other embodiments herein. Unlike previous embodiments, the frame 212 includes a plurality of leg subassemblies 216 with each subassembly 216 include a front leg 218, a back leg 220, and a cross member 222 extending between them. As best seen in FIG. 16B, each leg 218, 220 includes an upper end 218a, 220a coupled to opposite ends 222a, 222b, of the cross member 222 and a lower end 218b, 220b coupled to a shoe or base plate 225. For example, each leg 218, 222 may include a foot 224 integrally formed in, e.g., by bending the leg shaft, or attached to the lower end 218b, 220b to which the shoe plate 225 may be attached.

The legs 218, 220 may be fixedly attached to the cross member 222 or one or both legs 218, 220 may include a hinge coupling the upper ends 218a, 220b to the ends 222a, 222b of the cross member. In one embodiment, one or both legs 218, 220 may include an adjustment member 218c, 220c, which may be used to adjust the lengths of the legs 218, 220, e.g., to adjust an overall height for the leg subassembly 216 and/or angle of the cross member 222. For example, the legs 218, 220 may include a manual adjustment member 218c, 220c, e.g., a telescoping structure similar to other embodiments herein, that may be adjusted manually using tools or automatically adjusted using a motorized actuator (not shown).

During installation, a plurality of leg subassemblies 216 may be provided for each modular unit 210, e.g., two, three (as shown), four, or more, as desired based on the size and/or number of solar panels being mounted to the modular unit 210. The leg assemblies 216 may be spaced apart and oriented with the feet 224 against the ground (not shown), and then struts 214 may be attached to the leg assemblies 216, e.g., extending horizontally between the leg assemblies 216 as best seen in FIG. 16A. Optionally, additional structural supports may be added, e.g., one or more cables 230 attached to and/or extending between the leg subassemblies 216. For example, a cable may be attached to the back legs 220 or adjacent leg subassemblies 216, e.g., extending horizontally or diagonally between the leg subassemblies 216 to provide additional tensile and/or compressive support.

One or more toggle anchors 30 with cables and/or rods 40 may be inserted into the ground adjacent each leg 218, 220, tested, and coupled to respective shoe plates 225 and/or legs 218, 220, thereby providing an earth-anchoring foundation for the modular unit 210, similar to other embodiments herein. One or more solar panels 50 may be mounted to the struts 214 and, optionally, one or more solar inverters, energy storage systems, and/or components may be mounted to the modular unit 210, also similar to other embodiments herein. Alternatively, the modular unit 210 may be preassembled and delivered to an installation site (optionally with solar panels and/or components already mounted to the modular unit 210), the legs 218, 220 may be adjusted as desired, and anchors 30 with cables and/or rods 40 installed to secure the modular unit 210 at the installation site.

In accordance with each of the embodiments herein, once the modular units and solar panels and associated energy storage components are installed at an installation site, they may then be used to generate electricity, e.g., for use and/or energy storage at the installation site, similar to conventional solar panel systems. However, at any desired time, the cables and/or rods may be disconnected from the support legs (e.g., by removing the fasteners 42 and/or simply cutting the cables and/or rods), thereby allowing the modular units to be stored and/or transported for future use. For example, the legs 120 may be returned to the storage position, the modular units loaded onto a truck (e.g., as shown in FIGS. 13B-13D), whereupon the modular units may be transported to another location. Thus, the only material that may remain at the installation site are the anchors and cables within the ground, thereby minimizing the environmental impact of the platforms. Alternatively, sufficient tension may be applied to each of the rods and/or cables, e.g., equivalent to testing beyond load capacity, to pull the entire toggle anchor and associated subterranean rod and/or cable out of the ground, thereby leaving no material at the site after the panels are removed.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

What is claimed is:

1. A method for installing a solar panel array at an installation site including a ground defining a surface, comprising:
   providing a plurality of transportable, multi-configurable, modular solar power platforms, each platform including a support frame carrying one or more solar panels;
   for each platform:
   inserting one or more anchors, each including an elongate member, into the ground adjacent to the frame at the installation site such that an exposed end of each elongate member extends from below the surface to above the ground;
   performing a load lift (tension) test on each anchor by:
   i) placing a portable load test device adjacent the exposed end of each elongate member;
   ii) coupling the portable load test device to the exposed end of each elongate member;

iii) activating the portable load test device to apply a minimum tensile force to each elongate member;
iv) deactivating the portable load test device to remove the tensile force; and
coupling each elongate member to the support frame,
wherein performing the load lift (tension) test comprises applying a preset load requirement on each of the anchors, and
wherein the load lift (tension) test is performed before coupling each elongate member to the support frame.

2. The method of claim 1, wherein the portable load test device assigns GPS coordinates for each anchor with each load lift (tension) test and captures load test data results associated with each load lift (tension) test.

3. The method of claim 1, further comprising assigning a time stamp to each load lift (tension) test.

4. The method of claim 1, further comprising communicating the results of each load lift (tension) test to a remote location.

5. The method of claim 1, further comprising communicating the results of each load lift (tension) test to a cloud-based storage device.

6. The method of claim 5, wherein the results are communicated to facilitate verification remotely without the need for an onsite field inspection review.

7. The method of claim 1, wherein coupling each elongate member comprises introducing a fastener over the elongate member until the fastener engages a base plate.

8. The method of claim 1, wherein the portable load test device assigns GPS coordinates for each anchor with each load lift (tension) test to identify each anchor's location.

9. The method of claim 1, wherein the elongate member of each anchor comprises an elongate rod including a distal end sized for insertion into the ground.

10. The method of claim 9, wherein each anchor comprises an anchor member extending from the distal end of the elongate member configured to prevent removal of the distal end from the ground.

11. A method for securing a solar panel array hosting one or more solar panels including a support frame at an installation site including a ground defining a surface, the method comprising:
providing an anchor comprising an elongate member including a distal end;
directing the distal end of the elongate member into the ground at the installation site such that an exposed end of the elongate member extends from below the surface to above the ground;
conducting a load lift (tension) test by applying a tensile force between the exposed end with the distal end in the ground using a portable load test device; and
securing the exposed end to the support frame to secure the solar panel array relative to the ground at the installation site,
wherein conducting the load lift (tension) test comprises:
placing the portable load test device on the ground adjacent the exposed end of the elongate member;
coupling the portable load test device to the exposed end of the elongate member;
activating the portable load test device to apply the tensile force on the elongate member;
deactivating the portable load test device to remove the tensile force; and
removing the exposed end from the portable load test device,
wherein conducting the load lift (tension) test comprises applying a preset load requirement on the anchor, and
wherein the load lift (tension) test is conducted before coupling the elongate member to the support frame.

12. The method of claim 11, wherein directing the elongate member into the ground comprises coupling a first end of a driving rod to an anchor portion and using a tool to direct the anchor and first end of the driving rod into the ground, the method comprising removing the driving rod after directing the anchor to a desired depth within the ground, whereupon the exposed end is pulled to deploy the anchor portion to a transverse horizontal orientation, locking the anchor in place.

13. The method of claim 11, wherein securing the exposed end comprises advancing a fastener over the elongate member into engagement with a base plate.

14. The method of claim 13, further comprising securing the fastener to the elongate member to secure the base plate.

15. The method of claim 13, wherein the base plate supports the support frame.

16. The method of claim 11, wherein the elongate member includes one or both of a rod and a cable.

17. The method of claim 11, wherein the load lift (tension) test is performed before securing the exposed end to one or more of the first support leg, the base plate, and the strut of the support frame.

18. The method of claim 11, further comprising electronically communicating the results of the load lift (tension) test to a remote location.

19. A method for securing a solar panel array hosting one or more solar panels including a support frame at an installation site including a ground defining a surface, the method comprising:
providing an anchor comprising an elongate member including a distal end;
directing the distal end of the elongate member into the ground at the installation site such that an exposed end of the elongate member extends from below the surface to above the ground;
conducting a load lift (tension) test by applying a tensile force between the exposed end with the distal end in the ground using a portable load test device; and
securing the exposed end to the platform to secure the solar panel array relative to the ground at the installation site,
wherein conducting the load lift (tension) test comprises:
placing the portable load test device on the ground adjacent the exposed end of the elongate member;
coupling the portable load test device to the exposed end of the elongate member;
activating the portable load test device to apply the tensile force on the elongate member;
deactivating the portable load test device to remove the tensile force; and
removing the exposed end from the portable load test device,
wherein conducting the load lift (tension) test comprises applying a preset load requirement on the anchor, and
wherein the load lift (tension) test is conducted before coupling each elongate member to the support frame.

20. The method of claim 19, further comprising introducing a fastener over the elongate member until the fastener engages a base plate to secure the base plate to the elongate member.

21. The method of claim 19, wherein the portable load test device assigns GPS coordinates for the anchor with the load lift (tension) test.

22. The method of claim 19, further comprising assigning a time stamp to the load lift (tension) test.

\* \* \* \* \*